(12) United States Patent
Rule et al.

(10) Patent No.: US 11,102,007 B2
(45) Date of Patent: Aug. 24, 2021

(54) CONTACTLESS CARD EMULATION SYSTEM AND METHOD

(71) Applicant: Capital One Services, LLC, McLean, VA (US)

(72) Inventors: Jeffrey Rule, Chevy Chase, MD (US); Kevin Osborn, Newton, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/590,200

(22) Filed: Oct. 1, 2019

(65) Prior Publication Data

US 2020/0104826 A1 Apr. 2, 2020

Related U.S. Application Data

(60) Provisional application No. 62/740,352, filed on Oct. 2, 2018.

(51) Int. Cl.
*H04L 9/32* (2006.01)
*H04L 9/08* (2006.01)
(Continued)

(52) U.S. Cl.
CPC ......... *H04L 9/3234* (2013.01); *G06Q 20/204* (2013.01); *G06Q 20/3226* (2013.01);
(Continued)

(58) Field of Classification Search
CPC ............. G06Q 20/3278; G06Q 20/204; G06Q 20/3226; G06Q 20/352; G06Q 20/40; H04L 63/0853
See application file for complete search history.

(56) References Cited

U.S. PATENT DOCUMENTS 4,683,553 A 7/1987 Mollier
4,827,113 A 5/1989 Rikuna
(Continued)

FOREIGN PATENT DOCUMENTS

CA 3010336 A1 7/2017
CN 101192295 A 6/2008
(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.
(Continued)

*Primary Examiner* — Steven S Kim
*Assistant Examiner* — Nilesh B Khatri
(74) *Attorney, Agent, or Firm* — Kacvinsky Daisak Bluni PLLC

(57) ABSTRACT

A system and method are described that enables mobile devices (e.g. including but not limited to a mobile phone or the like), to intercept and respond to contactless card authentication requests, allowing mobile devices to be used in place of contactless cards. Enabling mobile phone devices to emulate contactless cards decreases issues related to lost or damaged cards, enabling a single device to be used to provide tokens related to multiple different contactless cards, and leverages functionality of the mobile device to provide dual-factor authentication.

20 Claims, 13 Drawing Sheets

(51) Int. Cl.
    *H04L 9/14* (2006.01)
    *G06Q 20/20* (2012.01)
    *G06Q 20/32* (2012.01)
    *G06Q 20/34* (2012.01)
    *G06Q 20/40* (2012.01)
    *H04L 29/06* (2006.01)

(52) U.S. Cl.
    CPC ....... *G06Q 20/3278* (2013.01); *G06Q 20/352* (2013.01); *G06Q 20/40* (2013.01); *H04L 9/0866* (2013.01); *H04L 9/14* (2013.01); *H04L 9/3228* (2013.01); *H04L 9/3242* (2013.01); *H04L 63/0853* (2013.01)

(56) References Cited

U.S. PATENT DOCUMENTS

| | | | |
|---|---|---|---|
| 4,910,773 | A | 3/1990 | Hazard et al. |
| 5,036,461 | A | 7/1991 | Elliott et al. |
| 5,363,448 | A | 11/1994 | Koopman, Jr. et al. |
| 5,377,270 | A | 12/1994 | Koopman, Jr. et al. |
| 5,533,126 | A | 7/1996 | Hazard |
| 5,537,314 | A | 7/1996 | Kanter |
| 5,592,553 | A | 1/1997 | Guski et al. |
| 5,616,901 | A | 4/1997 | Crandall |
| 5,666,415 | A | 9/1997 | Kaufman |
| 5,763,373 | A | 6/1998 | Robinson et al. |
| 5,764,789 | A | 6/1998 | Pare, Jr. et al. |
| 5,768,373 | A | 6/1998 | Lohstroh et al. |
| 5,778,072 | A | 7/1998 | Samar |
| 5,796,827 | A | 8/1998 | Coppersmith et al. |
| 5,832,090 | A | 11/1998 | Raspotnik |
| 5,883,810 | A | 3/1999 | Franklin et al. |
| 5,901,874 | A | 5/1999 | Deters |
| 5,929,413 | A | 7/1999 | Gardner |
| 5,960,411 | A | 9/1999 | Hartman et al. |
| 6,021,203 | A | 2/2000 | Douceur et al. |
| 6,049,328 | A | 4/2000 | Vanderheiden |
| 6,058,373 | A | 5/2000 | Blinn et al. |
| 6,061,666 | A | 5/2000 | Do et al. |
| 6,105,013 | A | 8/2000 | Curry et al. |
| 6,199,114 | B1 | 3/2001 | White et al. |
| 6,199,762 | B1 | 3/2001 | Hohle |
| 6,216,227 | B1 | 4/2001 | Goldstein et al. |
| 6,227,447 | B1 | 5/2001 | Campisano |
| 6,282,522 | B1 | 8/2001 | Davis et al. |
| 6,324,271 | B1 | 11/2001 | Sawyer et al. |
| 6,342,844 | B1 | 1/2002 | Rozin |
| 6,367,011 | B1 | 4/2002 | Lee et al. |
| 6,402,028 | B1 | 6/2002 | Graham, Jr. et al. |
| 6,438,550 | B1 | 8/2002 | Doyle et al. |
| 6,501,847 | B2 | 12/2002 | Helot et al. |
| 6,631,197 | B1 | 10/2003 | Taenzer |
| 6,641,050 | B2 | 11/2003 | Kelley et al. |
| 6,655,585 | B2 | 12/2003 | Shinn |
| 6,662,020 | B1 | 12/2003 | Aaro et al. |
| 6,721,706 | B1 | 4/2004 | Strubbe et al. |
| 6,731,778 | B1 | 5/2004 | Oda et al. |
| 6,779,115 | B1 | 8/2004 | Naim |
| 6,792,533 | B2 | 9/2004 | Jablon |
| 6,829,711 | B1 | 12/2004 | Kwok et al. |
| 6,834,271 | B1 | 12/2004 | Hodgson et al. |
| 6,834,795 | B1 | 12/2004 | Rasmussen et al. |
| 6,852,031 | B1 | 2/2005 | Rowe |
| 6,865,547 | B1 | 3/2005 | Brake, Jr. et al. |
| 6,873,260 | B2 | 3/2005 | Lancos et al. |
| 6,877,656 | B1 | 4/2005 | Jaros et al. |
| 6,889,198 | B2 | 5/2005 | Kawan |
| 6,905,411 | B2 | 6/2005 | Nguyen et al. |
| 6,910,627 | B1 | 6/2005 | Simpson-Young et al. |
| 6,971,031 | B2 | 11/2005 | Haala |
| 6,990,588 | B1 | 1/2006 | Yasukura |
| 7,006,986 | B1 | 2/2006 | Sines et al. |
| 7,085,931 | B1 | 8/2006 | Smith et al. |
| 7,127,605 | B1 | 10/2006 | Montgomery et al. |
| 7,128,274 | B2 | 10/2006 | Kelley et al. |
| 7,140,550 | B2 | 11/2006 | Ramachandran |
| 7,152,045 | B2 | 12/2006 | Hoffman |
| 7,165,727 | B2 | 1/2007 | de Jong |
| 7,175,076 | B1 | 2/2007 | Block et al. |
| 7,202,773 | B1 | 4/2007 | Oba et al. |
| 7,206,806 | B2 | 4/2007 | Pineau |
| 7,232,073 | B1 | 6/2007 | de Jong |
| 7,246,752 | B2 | 7/2007 | Brown |
| 7,254,569 | B2 | 8/2007 | Goodman et al. |
| 7,263,507 | B1 | 8/2007 | Brake, Jr. et al. |
| 7,270,276 | B2 | 9/2007 | Vayssiere |
| 7,278,025 | B2 | 10/2007 | Saito et al. |
| 7,287,692 | B1 | 10/2007 | Patel et al. |
| 7,290,709 | B2 | 11/2007 | Tsai et al. |
| 7,306,143 | B2 | 12/2007 | Bonneau, Jr. et al. |
| 7,319,986 | B2 | 1/2008 | Praisner et al. |
| 7,325,132 | B2 | 1/2008 | Takayama et al. |
| 7,373,515 | B2 | 5/2008 | Owen et al. |
| 7,374,099 | B2 | 5/2008 | de Jong |
| 7,375,616 | B2 | 5/2008 | Rowse et al. |
| 7,380,710 | B2 | 6/2008 | Brown |
| 7,424,977 | B2 | 9/2008 | Smets et al. |
| 7,453,439 | B1 | 11/2008 | Kushler et al. |
| 7,472,829 | B2 | 1/2009 | Brown |
| 7,487,357 | B2 | 2/2009 | Smith et al. |
| 7,568,631 | B2 | 8/2009 | Gibbs et al. |
| 7,584,153 | B2 | 9/2009 | Brown et al. |
| 7,597,250 | B2 | 10/2009 | Finn |
| 7,628,322 | B2 | 12/2009 | Holtmanns et al. |
| 7,652,578 | B2 | 1/2010 | Braun et al. |
| 7,689,832 | B2 | 3/2010 | Talmor et al. |
| 7,703,142 | B1 | 4/2010 | Wilson et al. |
| 7,748,609 | B2 | 7/2010 | Sachdeva et al. |
| 7,748,617 | B2 | 7/2010 | Gray |
| 7,748,636 | B2 | 7/2010 | Finn |
| 7,762,457 | B2 | 7/2010 | Bonalle et al. |
| 7,789,302 | B2 | 9/2010 | Tame |
| 7,793,851 | B2 | 9/2010 | Mullen |
| 7,796,013 | B2 | 9/2010 | Murakami et al. |
| 7,801,799 | B1 | 9/2010 | Brake, Jr. et al. |
| 7,801,829 | B2 | 9/2010 | Gray et al. |
| 7,805,755 | B2 | 9/2010 | Brown et al. |
| 7,809,643 | B2 | 10/2010 | Phillips et al. |
| 7,827,115 | B2 | 11/2010 | Weller et al. |
| 7,828,214 | B2 | 11/2010 | Narendra et al. |
| 7,848,746 | B2 | 12/2010 | Juels |
| 7,882,553 | B2 | 2/2011 | Tuliani |
| 7,900,048 | B2 | 3/2011 | Andersson |
| 7,908,216 | B1 | 3/2011 | Davis et al. |
| 7,922,082 | B2 | 4/2011 | Muscato |
| 7,933,589 | B1 | 4/2011 | Mamdani et al. |
| 7,949,559 | B2 | 5/2011 | Freiberg |
| 7,954,716 | B2 | 6/2011 | Narendra et al. |
| 7,954,723 | B2 | 6/2011 | Charrat |
| 7,962,369 | B2 | 6/2011 | Rosenberg |
| 7,993,197 | B2 | 8/2011 | Kaminkow |
| 8,005,426 | B2 | 8/2011 | Huomo et al. |
| 8,010,405 | B1 | 8/2011 | Bortolin et al. |
| RE42,762 | E | 9/2011 | Shin et al. |
| 8,041,954 | B2 | 10/2011 | Plesman |
| 8,060,012 | B2 | 11/2011 | Sklovsky et al. |
| 8,074,877 | B2 | 12/2011 | Mullen et al. |
| 8,082,450 | B2 | 12/2011 | Frey et al. |
| 8,095,113 | B2 | 1/2012 | Kean et al. |
| 8,099,332 | B2 | 1/2012 | Lemay et al. |
| 8,103,249 | B2 | 1/2012 | Markison |
| 8,108,687 | B2 | 1/2012 | Ellis et al. |
| 8,127,143 | B2 | 2/2012 | Abdallah et al. |
| 8,135,648 | B2 | 3/2012 | Oram et al. |
| 8,140,010 | B2 | 3/2012 | Symons et al. |
| 8,141,136 | B2 | 3/2012 | Lee et al. |
| 8,150,321 | B2 | 4/2012 | Winter et al. |
| 8,150,767 | B2 | 4/2012 | Wankmueller |
| 8,186,602 | B2 | 5/2012 | Itay et al. |
| 8,196,131 | B1 | 6/2012 | von Behren et al. |
| 8,215,563 | B2 | 7/2012 | Levy et al. |
| 8,224,753 | B2 | 7/2012 | Atef et al. |
| 8,232,879 | B2 | 7/2012 | Davis |

(56) References Cited

U.S. PATENT DOCUMENTS

| | | |
|---|---|---|
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |

(56) References Cited

U.S. PATENT DOCUMENTS

| | | |
|---|---|---|
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0095368 A1* | 4/2008 | Iida .................... H04L 63/0272 380/259 |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |

(56) References Cited

U.S. PATENT DOCUMENTS

| | | |
|---|---|---|
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0019442 A1 | 1/2015 | Hird et al. |
| 2015/0032635 A1 | 1/2015 | Guise |
| 2015/0046340 A1* | 2/2015 | Dimmick .............. H04L 63/104 705/72 |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0163063 A1* | 6/2015 | Lu ......................... H04L 9/0869 713/176 |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0220912 A1* | 8/2015 | Holdsworth ........ G06Q 20/4012 705/72 |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0348001 A1* | 12/2015 | Van Os ............... G06Q 20/3821 705/44 |
| 2015/0348007 A1* | 12/2015 | Khan .................... G06Q 20/321 705/44 |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0140545 A1* | 5/2016 | Flurscheim ........ G06Q 20/3829 705/76 |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0063848 A1* | 3/2017 | Collinge .............. G06Q 20/20 |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0123782 A1* | 5/2018 | Messerges ............ H04L 9/0819 |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2021/0036856 A1* | 2/2021 | Wang ..................... H04L 29/06 |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015084755 A1 | 6/2015 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |

(56) References Cited

FOREIGN PATENT DOCUMENTS

| WO | 2017208063 A1 | 12/2017 |
| WO | 2018063809 A1 | 4/2018 |
| WO | 2018137888 A1 | 8/2018 |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug BIG SEVEN open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CC 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

(56) References Cited

OTHER PUBLICATIONS

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card User Authentication for Contactless Smart Cards based on Gesture Recognition", paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

International Search Report and Written Opinion for International Patent Application No. PCT/2019/054150 dated Dec. 3, 2019, 17 pages.

Madhoun et al., "Security Enhancements in EMV Protocol for NEC Mobile Payment", 2016 IEEE TrustCom-BigDataSE-ISPA, pp. 1889-1895, Aug. 23, 2016.

Preneel et al., "A survey of Recent Developments in Cryptographic Algorithms for Smart Cards", Computer Networks, vol. 51, No. 9, pp. 2223-2233, Apr. 29, 2007.

* cited by examiner

```
00 D1(Message Begin, Message End, Short Record, noID length) 01 (well known type) 01 01 Text type
02 <Payload Length including recordID and 'EN', or contentlength+3) = 45+3 = 48 (DEC)
03 54 ('T')
04 02 record ID
05 65 6E (language length, 'en')
07 43 01 00 76 a6 62 7b 67 a8 cf bb <eight mac bytes>
D1 01 30 54 02 65 6E 43 01 00 76 A6 62 7B 67 A8 CF BB <eight mac bytes>
```

620

| VERSION | pUID (8) | pATC | ENCYPHERED CRYPTOGRAM (16) |
|---|---|---|---|
| 0100 | 0015399553600061 | 00000050 | 7D28B8B9D8666E514315 3AC9C944E5A6 |

| DECRYPTED CRYPTOGRAM | | | |
|---|---|---|---|
| RANDOM (8) | MAC (8) | | |
| 4838FB7DC171B89E | CF3F3B8C56DA0BF1 | | |

MAC(T = [pVERSION (2 BYTES) || pUID (8 BYTES) || pATC (4 BYTES) || pSHSEC (4 BYTES) || '80' || '00 00 00 00 00'])

CONTACTLESS CARD EMULATION SYSTEM AND METHOD

CROSS-REFERENCE TO RELATED APPLICATIONS

This application claims priority from U.S. Provisional Application No. 62/740,352, filed on Oct. 2, 2018, the disclosure of which is incorporated herein by reference in its entirety.

FIELD OF THE INVENTION

The present disclosure relates to cryptography, and more particularly, to systems and methods for the cryptographic authentication.

BACKGROUND

Data security and transaction integrity are of critical importance to businesses and consumers. As electronic transactions continue to increasingly dominate commercial activity, malicious parties continue to interfere with the electronic transactions to obtain valuable customer information for nefarious use. Accordingly, there is a need for improved authentication solutions that overcome security deficiencies and that may be used to control access to client information and accounts.

SUMMARY

Aspects of the disclosed technology include systems and methods for cryptographic authentication. In particular, systems and methods for emulating contactless card authentication are described that enable a user to use a mobile device in place of a contactless card for contactless card authentication at a transaction device.

According to one aspect, a device configured to emulate a contactless card includes a processor, a plurality of network interfaces including a contactless card interface and a non-volatile memory having contactless card emulation program code stored thereon. The contactless card emulation program code may be operable when executed upon by the processor to detect receipt of a contactless card authentication request received at the contactless card interface from a transaction device. The program may identify a contactless card associated with the contactless card authentication request, including retrieving, from a database storing information related to one or more contactless cards, a counter, a master key and a shared secret associated with the identified contactless card. The program may generate a response message, the response message including at least a portion of the shared secret, or at least a portion of the counter, or both. The program may generate a diversified key using at least a portion of the counter, the master key and one or more cryptographic algorithms, encode the response message by applying one or more cryptographic algorithms and the diversified key to the response message to yield a cryptogram response and transmit the cryptogram response to the transaction device over contactless card interface.

According to a another aspect, a method for emulating contactless card authentication by a client device includes intercepting a contactless card authentication request received by a contactless card interface of a client device from a transaction device, identifying a contactless card associated with the contactless card authentication request, retrieving, from a memory storing information associated with one or more contactless cards, a counter, a shared secret and a master key associated with the identified contactless card and generating a response message, the response message including at least a portion of the shared secret, or at least a portion of the counter, or both. The method includes generating a diversified key using at least a portion of the counter, the master key and one or more cryptographic algorithm, encoding the response message using one or more cryptographic algorithms and the diversified key to yield a cryptogram response and transmitting the cryptogram response to the transaction device over the contactless card interface.

According to further aspect, a method for using a mobile device in place of a contactless card for contactless card authentication is provided. The method includes the steps of storing information related to one or more contactless cards in a non-volatile memory of the mobile device, the information including, for each contactless card, a pair of device keys, a counter and a shared secret and intercepting a contactless card authentication request received at a contactless card interface of the mobile device from a transaction device. The method includes generating an encrypted cryptogram by identifying a contactless card associated with the contactless card authentication request. The method also includes retrieving the pair of device keys, the counter and the shared secret associated with the identified contactless card and generating a pair of session keys using on the pair of device keys and the counter. The method also includes generating a message using at least a portion of the shared secret, or at least a portion of the counter, or both. The method also includes encoding the message using a first session key of the pair of session keys to produce a cryptogram. The method also includes encrypting the cryptogram using a second session key of the pair of session keys to produce an encrypted cryptogram. The method also includes transmitting the encrypted cryptogram to the transaction device over the contactless card interface. The method also includes displaying, on a user interface of the mobile device, a status of the contactless card authentication request. Other embodiments of this aspect include corresponding computer systems, apparatus, and computer programs recorded on one or more computer storage devices, each configured to perform the actions of the methods.

Further features of the disclosed design, and the advantages offered thereby, are explained in greater detail hereinafter with reference to specific example embodiments illustrated in the accompanying drawings, wherein like elements are indicated with like reference designators.

BRIEF DESCRIPTION OF THE DRAWINGS

FIG. 6 is an illustration depicting a message and a message format according to an example embodiment.

DETAILED DESCRIPTION OF EXAMPLE EMBODIMENTS

Figure 1A:
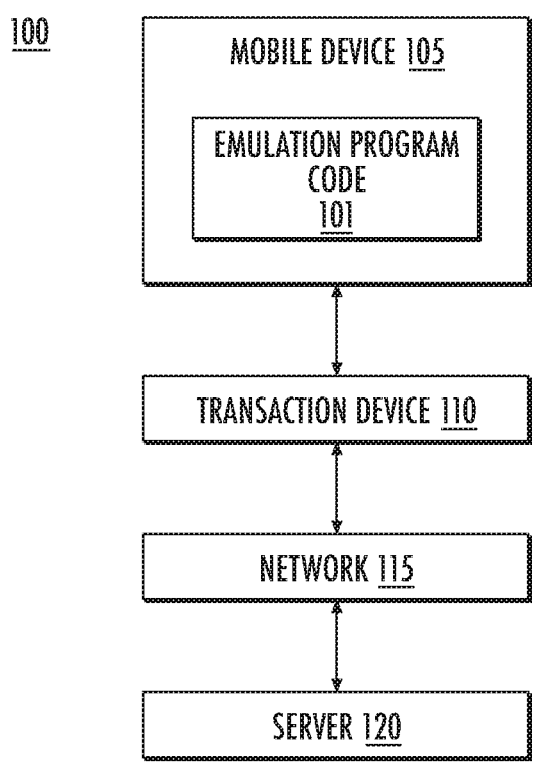
FIG. 1A is a diagram of a data transmission system according to an example embodiment.

The following description of embodiments provides non-limiting representative examples referencing numerals to particularly describe features and teachings of different aspects of the invention. The embodiments described should be recognized as capable of implementation separately, or in combination, with other described embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

According to one aspect, a mobile device includes program code for emulating the behavior of a contactless card, for example emulating the behavior of a contactless card that generates a dynamic cryptogram that may be used for authentication purposes. In particular, the emulation program code enables mobile devices (e.g. including but not limited to a mobile phone or the like), to intercept and responds to contactless card authentication requests, allowing mobile devices to be used in place of contactless cards. Enabling mobile phone devices to emulate contactless cards provides numerous advantages; for example, the size of contactless cards increases the potential that a card may become lost or damaged. When the contactless card is necessary for authentication of the user, a lost or damaged card may undesirably limit a user's ability to access accounts or perform transactions until a replacement card may be delivered.

Mobile devices, such as mobile phones, watches, tablets, etc. on the other hand, in addition to generally being larger and more robust than contactless cards, include additional technology that reduces the potential that the phone is lost. In the event that a mobile phone is lost, the mobile device interfaces (cellular, WIFI) may be used to locate the phone, reducing the potential that a lost phone is unrecoverable. Another advantage of using a mobile phone to emulate a contactless card is that the mobile phone may advantageously be configured for emulating multiple contactless cards. Information that is used to generate authentication tokens (including keys, counters, shared secrets, identifiers) may be stored in the memory of the mobile device, allowing the mobile phone to be used to emulate multiple different contactless cards, each of which may be used for different purposes. For example, in one embodiment, the mobile phone may be used to replace a contactless card that is used to authenticate a user prior to allowing access to a network. A separate contactless card emulation may support financial transactions of the user. Additional contactless cards may be used to support a variety of different authentication purposes, such as access to classified data, access to health information, etc.

In some embodiments, contactless card emulation program code monitors authentication requests received over interfaces generally used for contactless card transactions, such as Near Field Communication (NFC) interface, WIFI interfaces, Bluetooth interfaces and the like, although the present disclosure is not limited to the use of any particular interface for contactless card authentication token exchange.

According to one embodiment, the contactless card emulation program code may intercept communications and generate authentication tokens using systems and methods disclosed in U.S. Patent Application Serial Number U.S. patent application Ser. No. 16/205,119 filed Nov. 29, 2018, by Osborn, et al., entitled "Systems and Methods for Cryptographic Authentication of Contactless Cards" and incorporated herein by reference (hereinafter the '119 Application).

FIG. 1A illustrates a data transmission system according to an example embodiment. As further discussed below, system 100 may include mobile device 105, transaction device 110, network 115, and server 120. Although FIG. 1A illustrates single instances of the components, system 100 may include any number of components.

System 100 may include one or more mobile devices 105, which may include but are not limited to a mobile phone device or other mobile network enabled computer including at least a subset of the components explained below with reference to FIG. 5. According to one aspect, as described in more detail below, the mobile device 105 may be configured with contactless card emulation program code 101, enabling the mobile device 105 to generate an authentication cryptogram in response to a contactless card authentication request.

As referred to herein, a mobile network-enabled computer may include, but is not limited to a mobile computer device, or communications device including, e.g., a phone, a watch, a handheld PC, a personal digital assistant, or other device. The mobile device 105 may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. In some embodiments, mobile device 105 may be in wireless communication, utilizing NFC in an example, with transaction device 110.

System 100 may include transaction device 110, which may be either a mobile network-enabled computer as described above, or alternatively a fixed location network-enabled computer. As referred to herein, a fixed location network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Transaction device 110 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The mobile device 105 and transaction device 110 device may include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein. The transaction device 110 and/or mobile device 105 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, the mobile device 105 and/or transaction device 110 of system 100 may execute one or more applications, such as software applications, that enable network communications with one or more components of system 100, such as a transaction device 110 or other server coupled to network 115.

Transaction device 110 may be in communication with one or more servers 120 via one or more networks 115 and may operate as a respective front-end to back-end pair with server 120. Transaction device 110 may transmit one or more requests to server 120. The one or more requests to the server 120, including but not limited to authentication requests. Server 120 may receive the one or more requests from transaction device 110. Based on the one or more requests from transaction device 110, server 120 may be configured to retrieve data from one or more databases (not shown) for use in generating a response to the request from the transaction device 110.

System 100 may include one or more networks 115. In some examples, network 115 may be one or more of a wireless network, a wired network or any combination of wireless network and wired network and may be configured to connect transaction device 110 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may comprise a plurality of interconnected networks, such as, for example, the Internet, a service provider's network, a cable television network, corporate networks, such as credit card association networks, and home networks.

As described above, system 100 may include one or more servers 120. In some examples, server 120 may include one or more processors, which are coupled to memory. Server 120 may be configured as a central system, server or platform to control and call various data at different times to execute a plurality of workflow actions. Server 120 may be configured to connect to the one or more databases. Server 120 may be connected to at least one transaction device 110.

Figure 1B:
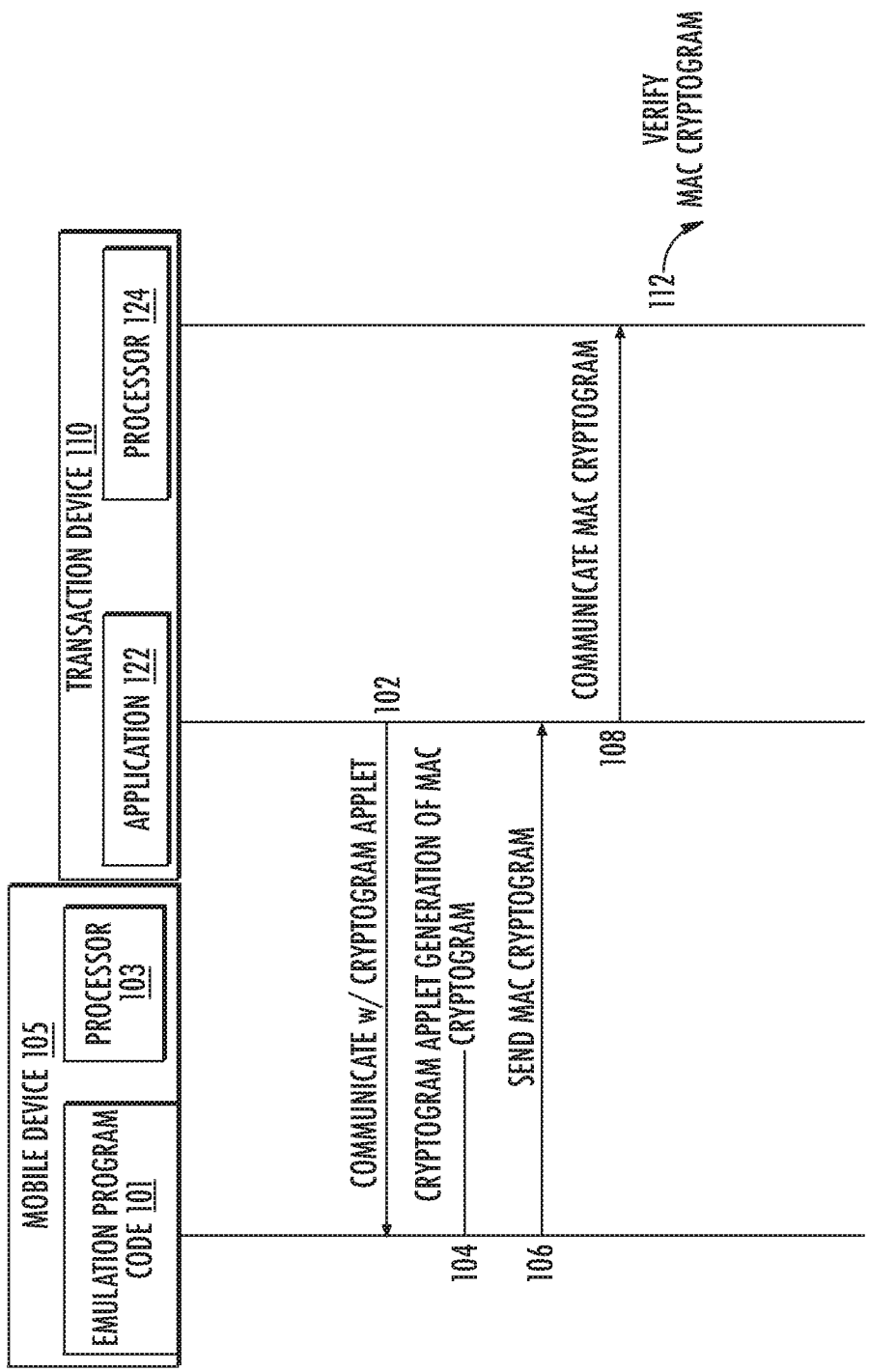
FIG. 1B is a diagram illustrating a sequence for providing authenticated access according to an example embodiment.

FIG. 1B is a timing diagram illustrating exemplary steps of one method for providing authenticated access according to one or more embodiments of the present disclosure. System 100 may comprise mobile device 105 including emulation program code 101 stored in memory thereon and accessible by a processor 103 to intercept contactless card authentication requests and to perform a cryptogram generation function. The system 100 is shown to also include a transaction device 110, which may include an application 122 and processor 124.

At step 102, the application 122 communicates with the mobile device 105 (e.g., after being brought near the mobile device 105). In some embodiments, such communication may include the application 122 communicating with one or more applications on the mobile device, for example to display a prompt on a user interface of the mobile device 105 to cause a user to move the mobile device 105 into proximity with the transaction device 110.

Communication between the transaction device 110 and the mobile device 105 may be performed using NFC communication channels. Communication between the application 122 and the mobile device 105 may involve the mobile device 105 being sufficiently close to a card reader (not shown) of the transaction device 110 to enable NFC data transfer between the application 122 and the mobile device 105.

At step 104, after communication has been established between transaction device 110 and mobile device 105, the emulation program code 101 executing on the mobile device 105 intercepts a contactless card authentication request and generates a message authentication code (MAC) cryptogram. In some examples, this may occur when the application 122 reads or otherwise forwards an application associated with a contactless card applet which is intercepted by the emulation program code 101 of the mobile device 105.

In one embodiment, this may occur upon the transaction device 110 issuing a read, such as an NFC read, of a near field data exchange (NDEF) tag, which may be created in accordance with the NFC Data Exchange Format. For example, a reader, such as application 122, may transmit a message, such as an application select message, with the application ID of an NDEF producing application known to be associated with a contactless card cryptogram authentication applet. The NDEF read is intercepted by emulation program code 101. The emulation program code of the mobile device may confirmation of the selection of the NDEF read, causing the transaction device 110 to issue transmit a sequence of select file messages followed by read file messages. For example, the sequence of select messages may be transmitted from the transaction device 110 to the mobile device 105, the series of messages including "Select Capabilities file", "Read Capabilities file", and "Select NDEF file". Each of these messages may be intercepted by the emulation program code. Following identification of the appropriate NDEF file, the transaction device 110 may then forward a "Read NDEF file" message to the mobile device 105.

Upon receipt of a "Select NDEF file" that requests a cryptogram from application 101, the emulation program code may identify the particular contactless card associated with the NDEF read. In one embodiment, the mobile device may store information related to a plurality of contactless cards, including but not limited to a counter, a shared secret and a master key. (??) The emulation program code may identify the particular contactless card to use for the transaction, either by extracting or inferring the contactless card identifier from the NDEF read, or alternatively in response to selection of a contactless card by a user at a user interface of the mobile device. The emulation program code retrieves the counter, shared secret and master key associated with the identified contactless card, and updates or increments the counter value associated with the card and maintained by the mobile device 105. In response to receipt of the "Read NDEF file" by the emulation program code 101, the mobile device 105 may generate a message including a header and the shared secret. In one embodiment, the emulation program code 101 may then generate one or more session keys, and a MAC cryptogram may be created from the message, which, as described, may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex, packaged by the emulation program code 101 in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, application 122 may be configured to transmit a request to a contactless card, which is intercepted by mobile device 105, the request comprising an instruction to generate a MAC cryptogram. The emulation program code 101 may generate the cryptogram as described.

At step 106, the mobile device 105 sends the MAC cryptogram to the application 122. In some examples, the transmission of the MAC cryptogram occurs via NFC, however, the present disclosure is not limited thereto. In other examples, this communication may occur via Bluetooth, Wi-Fi, or other means of wireless data communication.

At step 108, the application 122 communicates the MAC cryptogram to the processor 124.

At step 112, the processor 124 verifies the MAC cryptogram pursuant to an instruction from the application 122. For example, the MAC cryptogram may be verified, as explained below.

In some examples, verifying the MAC cryptogram may be performed by a device other than transaction device 110, such as a server 120 in data communication with the transaction device 110 (as shown in FIG. 1A). For example, processor 124 may output the MAC cryptogram for transmission to server 120, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

Figure 2:
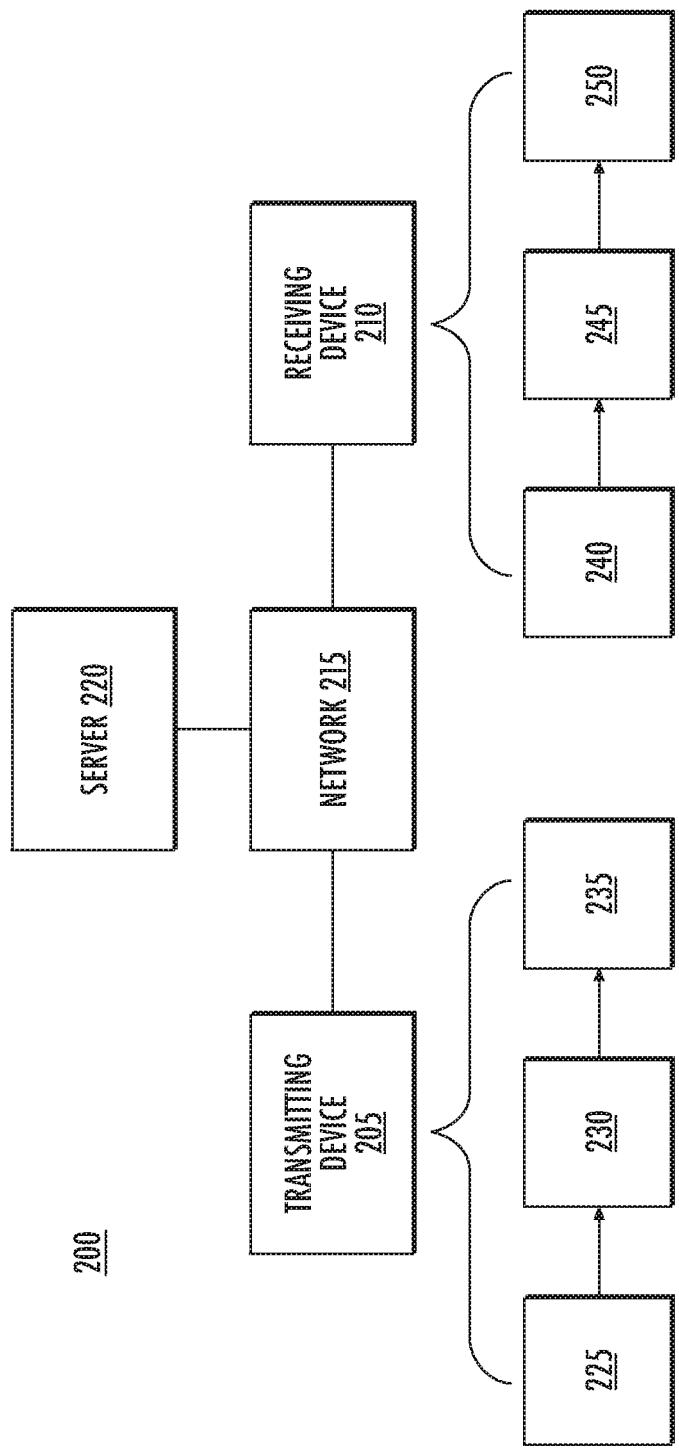
FIG. 2 is a diagram of a data transmission system according to an example embodiment.

FIG. 2 illustrates a data transmission system according to an example embodiment. System 200 may include a transmitting or sending device 205, a receiving or recipient device 210 in communication, for example via network 215, with one or more servers 220. Transmitting or sending device 205 may be the same as, or similar to, mobile device 105 executing emulation program code 101 as discussed above with reference to FIG. 1A. Receiving or recipient device 210 may be the same as, or similar to, transaction device 110 discussed above with reference to FIG. 1A. Network 215 may be similar to network 115 discussed above with reference to FIG. 1A. Server 220 may be similar to server 120 discussed above with reference to FIG. 1A. Although FIG. 2 shows single instances of components of system 200, system 200 may include any number of the illustrated components.

When using symmetric cryptographic algorithms, such as encryption algorithms, hash-based message authentication code (HMAC) algorithms, and cipher-based message authentication code (CMAC) algorithms, it is important that the key remain secret between the party that originally processes the data that is protected using a symmetric algorithm and the key, and the party who receives and processes the data using the same cryptographic algorithm and the same key.

It is also important that the same key is not used too many times. If a key may be used or reused too frequently, that key may be compromised. Each time the key may be used, it provides an attacker an additional sample of data which was processed by the cryptographic algorithm using the same key. The more data which the attacker has which was processed with the same key, the greater the likelihood that the attacker may discover the value of the key. A key used frequently may be comprised in a variety of different attacks.

Moreover, each time a symmetric cryptographic algorithm is executed, it may reveal information, such as side-channel data, about the key used during the symmetric cryptographic operation. Side-channel data may include minute power fluctuations which occur as the cryptographic algorithm executes while using the key. Sufficient measurements may be taken of the side-channel data to reveal enough information about the key to allow it to be recovered by the attacker. Using the same key for exchanging data would repeatedly reveal data processed by the same key.

However, by limiting the number of times a particular key may be used, the amount of side-channel data which the attacker is able to gather is limited and thereby reduces exposure to this and other types of attack. As further described herein, the parties involved in the exchange of cryptographic information (e.g., sender and recipient) may independently generate keys from an initial shared master symmetric key in combination with a counter value, and thereby periodically replace the shared symmetric key being used with needing to resort to any form of key exchange to keep the parties in sync. By periodically changing the shared secret symmetric key used by the sender and the recipient, the attacks described above are rendered impossible.

Referring back to FIG. 2, system 200 may be configured to implement key diversification. For example, a sender and recipient may desire to exchange data (e.g., original sensitive data) via respective devices 205 and 210. As explained above, although single instances of transmitting device 205 and receiving device 210 may be included, it is understood that one or more transmitting devices 205 and one or more receiving devices 210 may be involved so long as each party shares the same shared secret symmetric key. In some examples, the transmitting device 205 and receiving device 210 may be provisioned with the same master symmetric key. Further, it is understood that any party or device holding the same secret symmetric key may perform the functions of the transmitting device 205 and similarly any party holding the same secret symmetric key may perform the functions of the receiving device 210. In some examples, the symmetric key may comprise the shared secret symmetric key which is kept secret from all parties other than the transmitting device 205 and the receiving device 210 involved in exchanging the secure data. It is further understood that both the transmitting device 205 and receiving device 210 may be provided with the same master symmetric key, and further that part of the data exchanged between the transmitting device 205 and receiving device 210 comprises at least a portion of data which may be referred to as the counter value. The counter value may comprise a number that changes each time data is exchanged between the transmitting device 205 and the receiving device 210. In one embodiment, the transmitting device 205 and receiving device (and/or the server 220) may each store a copy of the counter value, which is updated independently by each device in response to a predetermined counter update protocol. As described above, when the transmitting device is a mobile device 105 executing emulation program code 101, the mobile device may store information related to a plurality of contactless cards, including counters, shared secrets and one or more keys for each contactless card.

System 200 may include one or more networks 215. In some examples, network 215 may be one or more of a wireless network, a wired network or any combination of wireless network and wired network and may be configured to connect one or more transmitting devices 205 and one or more receiving devices 210 to server 220. For example, network 215 may include one or more of a fiber optics network, a passive optical network, a cable network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, RFID, Wi-Fi, and/or the like.

In addition, network 215 may include, without limitation, telephone lines, fiber optics, IEEE Ethernet 902.3, a wide area network, a wireless personal area network, a LAN, or a global network such as the Internet. In addition, network 215 may support an Internet network, a wireless communication network, a cellular network, or the like, or any combination thereof. Network 215 may further include one network, or any number of the exemplary types of networks mentioned above, operating as a stand-alone network or in cooperation with each other. Network 215 may utilize one or more protocols of one or more network elements to which they are communicatively coupled. Network 215 may translate to or from other protocols to one or more protocols of network devices. Although network 215 is depicted as a single network, it should be appreciated that according to one or more examples, network 215 may comprise a plurality of interconnected networks, such as, for example, the Internet, a service provider's network, a cable television network, corporate networks, such as credit card association networks, and home networks.

In some examples, one or more transmitting devices 205 and one or more receiving devices 210 may be configured to communicate and transmit and receive data between each other without passing through network 215. For example, communication between the one or more transmitting devices 205 and the one or more receiving devices 210 may occur via at least one of NFC, Bluetooth, RFID, Wi-Fi, and/or the like.

At block 225, when the transmitting device 205 is preparing to process the sensitive data with symmetric cryptographic operation, the sender may update the copy of the counter associated with the identified contactless card that is selected for use in authentication. In addition, the transmitting device 205 may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include both encryption algorithms, hash algorithms, or a combination thereof. For example, a symmetric encryption algorithm such as 3DES or AES128 may be used. Symmetric hash algorithms include but are not limited to the HMAC algorithm, such as HMAC-SHA-256 or a symmetric CMAC algorithm such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

At block 230, the transmitting device 205 may take the selected cryptographic algorithm, and using the master symmetric key, process the counter value to generate a diversified symmetric key. For example, the sender may select a symmetric encryption algorithm, and use a counter which updates with every conversation between the transmitting device 205 and the receiving device 210. The transmitting device 205 may then encrypt or hash the counter value with the selected symmetric encryption/hash algorithm using the master symmetric key, creating a diversified symmetric key. In some embodiments, the counter value may itself comprise the diversified symmetric key At block 235, the diversified symmetric key may be used to process the sensitive data to provide a cryptogram, before transmitting the cryptogram to the receiving device 210. For example, the transmitting device 205 may encrypt or hash the sensitive data using a symmetric encryption/hash algorithm using the diversified symmetric key, producing a cryptogram comprising protected encrypted or hashed data. The transmitting device 205 may then transmit the cryptogram to the receiving device 210 for cryptogram validation.

Cryptogram validation may be performed by an authentication server such as server 220, or by a receiving device 210, which may be, for example, a merchant transaction device 210 or any network enabled computer comprising cryptogram validation logic as described below. In FIG. 2, cryptogram validation is described as performed by receiving device 210.

At block 240, the receiving device 210 may first take its stored copy of the counter value and stored copy of its master symmetric key, and then perform the same symmetric encryption and/or hash function to generate a copy of the diversified key. Provided that the counters are synchronized, the output of the encryption/hash provides the same diversified symmetric key for both the receiving device 210 and the transmitting device 205.

Depending upon whether encryption or hashing may be used, the receiving device may authenticate the cryptogram in one of two ways. In the event that the cryptogram comprises encrypted information, at block 250 the receiving device 210 may decrypt the protected encrypted data using a symmetric decryption algorithm along with the generated diversified symmetric key, to extract the header/shared secret, counter or other information stored as part of the cryptogram message.

The receiving device may then compare the decrypted counter and/or decrypted header, shared secret message against an expected counter or header/shared secret message associated with the transmitting device 205. A match between the expected counter and/or expected shared secret and the shared secret and/or counter exposed following decryption occurs when diversified keys match, which establishes that both the transmitting device 205 and receiving device 210 have knowledge both of the master keys and the updated counter values.

In some embodiments, the diversified keys may be used to hash the message (header, shared secret) generated by the transmitting device 205, and in such systems the cryptogram may comprise a hashed result. Hashed results may provide increased security as they may not be decrypted to expose sensitive content. In such systems, at step 235, the transmitting device 205 transmits the hashed cryptogram to receiving device 210. As described above, the receiving device at step 240 may take its stored copy of the counter value and stored copy of its master symmetric key, and then perform the same symmetric encryption and/or hash function to generate a diversified key copy. The diversified key copy may be used to generate an expected hashed cryptogram, for example, by applying the HMAC or other symmetric hashing function to an expected shared secret and header for the message. The expected hashed cryptogram may then be compared against the received cryptogram to determine a match, which establishes that both the transmitting device 205 and receiving device 210 have knowledge of both the master key and the appropriate counter value. In some embodiments, the hashed cryptogram may be encrypted prior to transmission, and decrypted following transmission and before the hash compare for increased security.

When sensitive data is next sent from the sender to the recipient via respective transmitting device 205 and receiving device 210, a different counter value may be selected to produce a different diversified symmetric key. By processing the counter value with the master symmetric key and same symmetric cryptographic algorithm, both the transmitting device 205 and receiving device 210 may independently produce the same diversified symmetric key. This diversified symmetric key, not the master symmetric key, may be used to protect the sensitive data. Because the diversified symmetric key is independently created by both the transmitting device 205 and receiving device 210, it is never transmitted between the two parties. Thus, an attacker may not intercept the diversified symmetric key and the attacker never sees any data which was processed with the master symmetric key. Only the counter value is processed with the master symmetric key, not the sensitive data. As a result, reduced side-channel data about the master symmetric key is revealed. Moreover, the operation of the transmitting device 205 and the receiving device 210 may be governed by symmetric requirements for how often to create a new diversification value, and therefore a new diversified symmetric key. In an embodiment, a new diversification value and therefore a new diversified symmetric key may be created for every exchange between the transmitting device 205 and receiving device 210.

In some examples, the key diversification value may comprise the counter value. Other non-limiting examples of the key diversification value include: a random nonce generated each time a new diversified key is needed, the random nonce sent from the transmitting device 205 to the receiving device 210; the full value of a counter value sent from the transmitting device 205 and the receiving device 210; a portion of a counter value sent from the transmitting device 205 and the receiving device 210; a counter independently maintained by the transmitting device 205 and the receiving device 210 but not sent between the two devices; a one-time-passcode exchanged between the transmitting device 205 and the receiving device 210; and a cryptographic hash of the sensitive data. In some examples, one or more portions of the key diversification value may be used by the parties to create multiple diversified keys. For example, a counter may be used as the key diversification value. Further, a combination of one or more of the exemplary key diversification values described above may be used.

In another example, a portion of the counter may be used as the key diversification value. If multiple master key values are shared between the parties, the multiple diversified key values may be obtained by the systems and processes described herein. A new diversification value, and therefore a new diversified symmetric key, may be created as often as needed. In the most secure case, a new diversification value may be created for each exchange of sensitive data between the transmitting device 205 and the receiving device 210. In effect, this may create a one-time use key, such as a single-use session key.

In other examples, such as to limit the number of times of use of the master symmetric key, it may be agreed upon by the sender of transmitting device and recipient of the receiving device that a new diversification value, and therefore a new diversified symmetric key, may happen only periodically. In one example, this may be after a pre-determined number of uses, such as every 10 transmissions between the transmitting device and the receiving device. In another example, this may be after a certain time period, a certain time period after a transmission, or on a periodic basis (e.g., daily at a designated time; weekly at a designated time on a designated day). In another example, this may be every time the receiving device signals to the transmitting device that it desires to change the key on the next communication. This may be controlled on policy and may be varied due to, for example, the current risk level perceived by the recipient of the receiving device.

Figure 3:
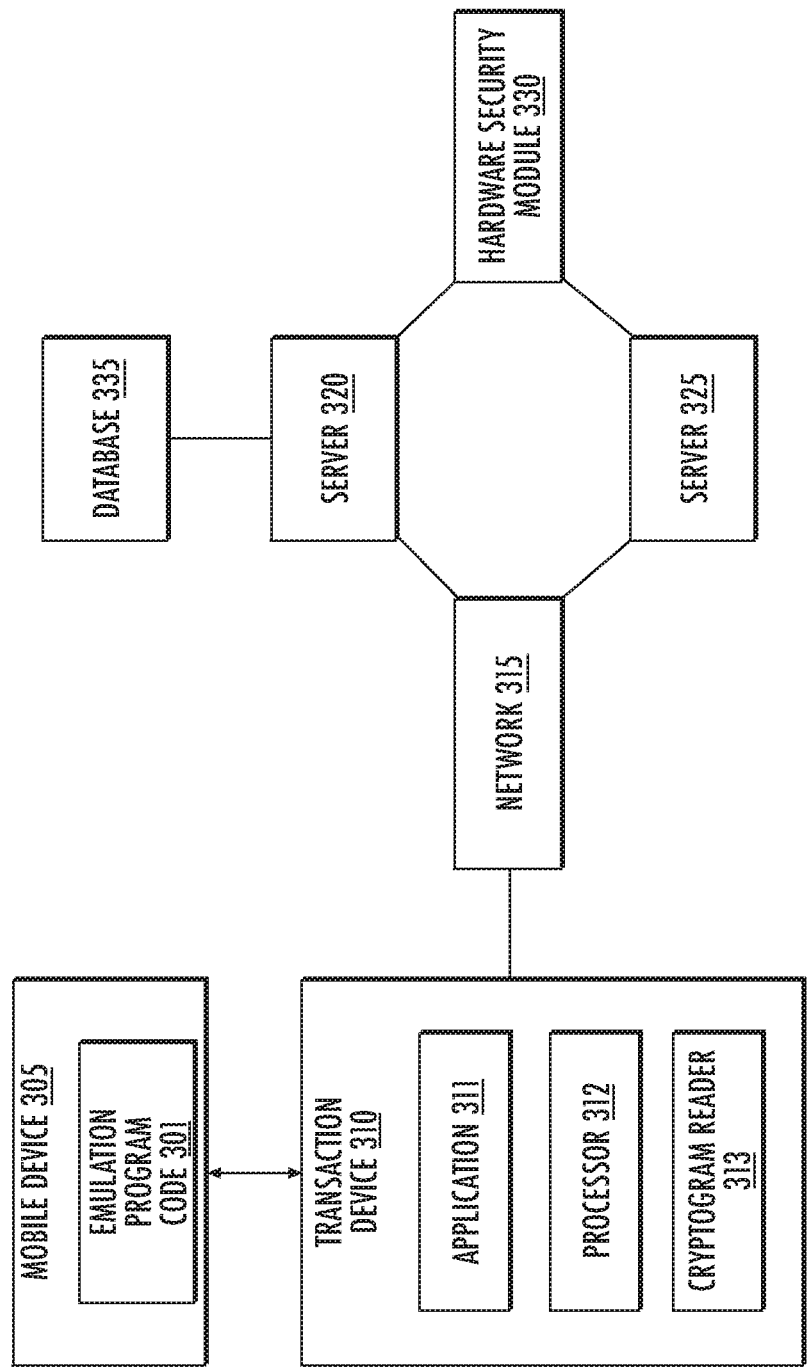
FIG. 3 is a diagram of a system using a mobile device according to an example embodiment.

FIG. 3 illustrates a system 300 using a mobile device 105 including contactless card emulation program code 101 configured to intercept contactless card authentication requests and to provide a cryptogram for authentication purposes as described with regard to FIG. 2. System 300 may include a mobile device 305, one or more transaction devices 310, network 315, servers 320, 325, one or more hardware security modules 330, and a database 335. Although FIG. 3 illustrates single instances of the components, system 300 may include any number of components.

Mobile devices 305 may be, for example, a phone, watch or other portable, network enabled computing device. In some examples, mobile device 305 may be in wireless communication, for example NFC communication, with transaction device 310 via a contactless card interface. For example, mobile device 305 may comprise one or more chips, such as a radio frequency identification chip, configured to communication via NFC or other short-range protocols. In other embodiments, mobile device 305 may communicate with transaction device 310 through other means including, but not limited to, Bluetooth, satellite, Wi-Fi, wired communications, and/or any combination of wireless and wired connections. According to some embodiments, mobile device 305 may be configured to communicate with cryptogram reader 313 of transaction device 310 through NFC when mobile device 305 is within range of cryptogram reader 313. In other examples, communications with mobile device 305 may be accomplished through a physical interface, e.g., a universal serial bus interface or a card swipe interface. Emulation program code 301 of the mobile device 305 may be configured to monitor communications received over the contactless card interface, intercept contactless card authentication requests and generate authentication cryptograms in response.

System 300 may include transaction device 310, which may be a network-enabled computer. In some examples, the transaction device 310 may be the same as, or similar to, a transaction device 110 as described with reference to FIG. 1A or FIG. 1B.

Transaction device 310 may be in communication with one or more servers 320 and 325 via one or more networks 315. Transaction device 310 may transmit, for example from an application 311 executing on transaction device 310, one or more requests to one or more servers 320 and 325. The one or more requests may be associated with retrieving data from one or more servers 320 and 325. Servers 320 and 325 may receive the one or more requests from transaction device 310. Based on the one or more requests from transaction device 310, one or more servers 320 and 325 may be configured to retrieve the requested data from one or more databases 335. Based on receipt of the requested data from the one or more databases 335, one or more servers 320 and 325 may be configured to transmit the received data to transaction device 310, the received data being responsive to one or more requests.

System 300 may include one or more hardware security modules (HSM) 330. For example, one or more HSMs 330 may be configured to perform one or more cryptographic operations as disclosed herein. In some examples, one or more HSMs 330 may be configured as special purpose security devices that are configured to perform the one or more cryptographic operations. The HSMs 330 may be configured such that keys are never revealed outside the HSM 330, and instead are maintained within the HSM 330. For example, one or more HSMs 330 may be configured to perform at least one of key derivations, decryption, and MAC operations. The one or more HSMs 330 may be contained within, or may be in data communication with, servers 320 and 325.

System 300 may include one or more networks 315. In some examples, network 315, similar to network 215 of FIG. 2, may comprise one or more of a wireless network, a wired network or any combination of wireless network and wired network and may be configured to connect client device 315 to server 320 and 325. As a non-limiting example, communications from mobile device 305 and transaction device 310 may comprise NFC communication, cellular network between transaction device 310 and a carrier, and Internet between the carrier and a back-end. Network 315 may further include one network, or any number of the exemplary types of networks mentioned previously herein, operating as a stand-alone network or in cooperation with each other. Network 315 may utilize one or more protocols of one or more network elements to which they are communicatively coupled. Network 315 may translate to or from other protocols to one or more protocols of network devices. Although network 315 is depicted as a single network, it should be appreciated that according to one or more examples, network 315 may comprise a plurality of interconnected networks, such as, for example, the Internet, a service provider's network, a cable television network, corporate networks, such as credit card association networks, and home networks.

In various examples according to the present disclosure, transaction device 310 of system 300 may execute one or more applications 311, and include one or more processors 312, and one or more cryptogram readers 313. For example, one or more applications 311, such as software applications, may be configured to enable, for example, network communications with one or more components of system 300 and transmit and/or receive data. It is understood that although only single instances of the components of transaction device 310 are illustrated in FIG. 3, any number of devices 310 may be used. Cryptogram reader 313 may be configured to read from and/or communicate with a mobile device 305 and/or a contactless card as described in the '119 Application. In conjunction with the one or more applications 311, cryptogram reader 313 may communicate with mobile device 305.

The application 311 of any of transaction device 310 may communicate with the mobile device 305 using short-range wireless communication (e.g., NFC). The application 311 may be configured to interface with a cryptogram reader 313 of transaction device 310 configured to communicate with a mobile device 305. As should be noted, those skilled in the art would understand that a distance of less than twenty centimeters is consistent with NFC range.

In some embodiments, the application 311 communicates through an associated reader (e.g., cryptogram reader 313) with the mobile device 305.

In some embodiments, the emulation program code 301 of the mobile device 305 may be activated for use as a provider of cryptogram authentication tokens related to a particular contactless card prior to its first use as an authentication source. Activation may be achieved in a variety of manners. For example, the activation may occur upon download of the emulation program code 101 from a service provider website, where the service provider may be any service provider that uses cryptograms such as those disclosed herein for authentication purposes.

In other embodiments, activation may occur upon first use of the emulation program code 101 by the mobile device 305 for cryptogram authentication. For example, a mobile device 305 may communicate with the application 311 through the cryptogram reader 313 of the transaction device 310 through NFC. The communication (e.g., a tap or other movement of the mobile device 105 proximate the cryptogram reader 313 of the transaction device 310) allows the application 311 to read the data associated with the mobile device 305 and enable use of the mobile device as an authentication source. In some cases, detection of a mobile device 305 including emulation program code 301 may activate or launch application 311 and then initiate one or more actions or communications with an account server 325 to activate the mobile device 305 for subsequent use as an authentication source. In some cases, if the application 311 is not installed on transaction device 310, a tap or other movement of the mobile device 305 including emulation program code 301 against or proximate to the cryptogram reader 313 may initiate a download of the application 311 (e.g., navigation to an application download page). Subsequent to installation, a tap or other movement of the mobile device 305 may activate or launch the application 311, and then initiate (e.g., via the application or other back-end communication) activation of the mobile device 305 for cryptogram authentication token use. After activation, the mobile device 305 may be used in various transactions, including commercial transactions.

Server 320 may comprise a web server in communication with database 335. Server 325 may comprise an account server. In some examples, server 320 may be configured to validate one or more credentials from mobile device 305 and/or transaction device 310 by comparison with one or more credentials in database 335. Server 325 may be configured to authorize one or more requests, such as payment and transaction, from mobile device 305 and/or transaction device 310.

Figure 4:
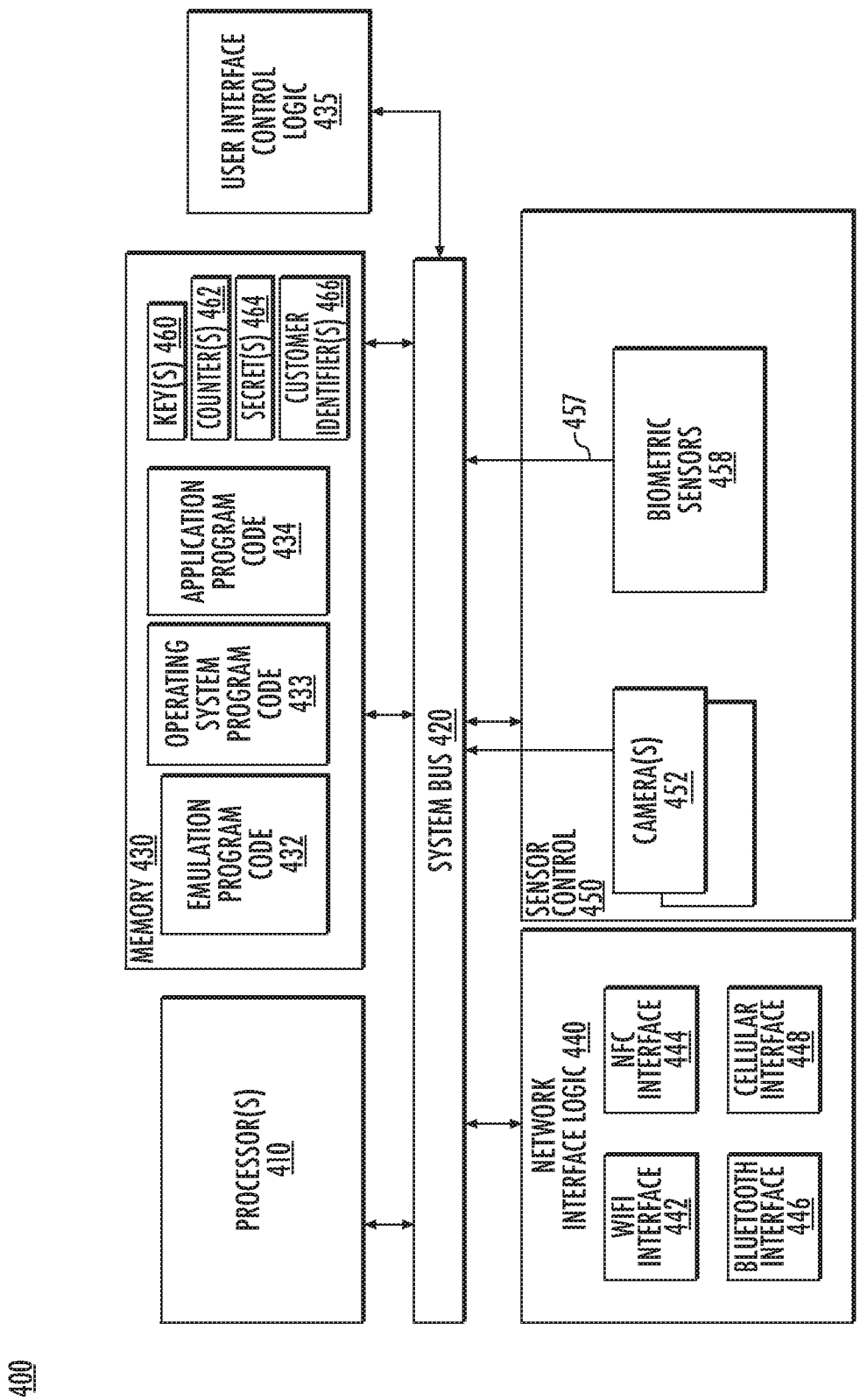
FIG. 4 is an illustration of a mobile device according to an example embodiment.

FIG. 4 is a block diagram of representative components of a mobile phone or other NFC capable mobile device 400 including emulation program code 432 configured to support cryptogram authentication as disclosed herein. The components include network interface logic 440, one or more processors 410, a memory 430, User Interface control logic 435, network interface logic 440 and sensor control 450 coupled via system bus 420.

Each of the components performs particular functions using hardware, software or a combination thereof. Processor(s) 410 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, processes, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Memory 430 may comprise a computer-readable storage medium to store program code configured to perform various functions. For example, the program code may include operating system program code 433 to control the general operation of the mobile device 400, including controlling network and user interfaces, display of content and allocating resources to one or more applications supported by the application program code 434. User interface control logic 435 may comprise a combination of hardware and software components that cooperate with program code to display, solicit and/or interpret information received from applications and network and user interfaces, such as displays and touchscreens. The user interface control logic 435, for example, may provide prompts to solicit user input, and may interpret user input received from graphical user interface elements such as buttons, menus, icons, tabs, windows, widgets etc. that may be displayed on a user display under control of a display control screen of the mobile device 400.

Examples of a computer-readable storage medium may include any tangible media capable of storing electronic data, including volatile memory or non-volatile memory, removable or non-removable memory, erasable or non-erasable memory, writeable or re-writeable memory, and so forth. Program code may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

Emulation program code 432 comprises program code as disclosed herein for intercepting contactless card authentication requests and generating a cryptogram for use in authenticating the mobile device 400 as disclosed herein. The emulation program code 432 may be used for a variety of purposes. For example, a mobile device 400 including cryptogram generation capability may be used to validate the identity of the user prior to allowing the user to access a resource. For example, mobile devices such as those described herein may be used in replace of a Common Access Cards (CAC), in place of key fobs, contactless cards, etc. Memory 430 may store data contactless card information for one or more contactless cards for use by the emulation program code 432, including, for each contactless card, one or more key(s) 460 and at least one counter 462 and a shared secret 464. Other information, including a shared secret 464 and/or a unique customer identifier 466 (pUID) may also be stored in memory 430 for use by the emulation program code 432. The one or more counters 462 may comprise a numeric counter sufficient to store an integer. The customer identifier (pUID) 466 may comprise a unique alphanumeric identifier assigned to a user of the mobile device 400, and the identifier may distinguish the user of the mobile device from other mobile device users. In some examples, the customer identifier 466 may identify both a customer and an account assigned to that customer and may further identify the mobile device associated with the customer's account.

As described above, in one embodiment the emulation program code 432 may be configured to intercept and respond to one or more requests, such as near field data exchange requests, from a reader, such as a mobile NFC reader, and produce an NDEF message that comprises a cryptographically secure One Time Password (OTP) encoded as an NDEF text tag.

The system bus 420 provides an interface for system components including, but not limited to, the memory 430 and to the processors 410. The system bus 420 may be any of several types of bus structure that may further interconnect to a memory bus (with or without a memory controller), a peripheral bus, and a local bus using any of a variety of commercially available bus architectures.

Network Interface logic includes transmitters, receivers, and controllers configured to support various known protocols associated with different forms of network communications. Example network interfaces that may be included in a mobile phone implementing the methods disclosed herein include, but are not limited to a WIFI interface 442, an NFC interface 444, a Bluetooth Interface 446 and a Cellular Interface 448.

Sensor control 450 comprises a subset of sensors that may support the position alignment methods disclosed herein, including camera(s) 452, including camera technology for capturing two dimensional and three dimensional light based or infrared images. The sensor control 450 may also include one or more biometric sensors 458. In some embodiments, one or both of the cameras 452 and biometric sensors 458 may provide a second factor of authentication that may be used in conjunction with the cryptogram authentication token to provide dual factor authentication using the mobile device 400.

Figure 5:
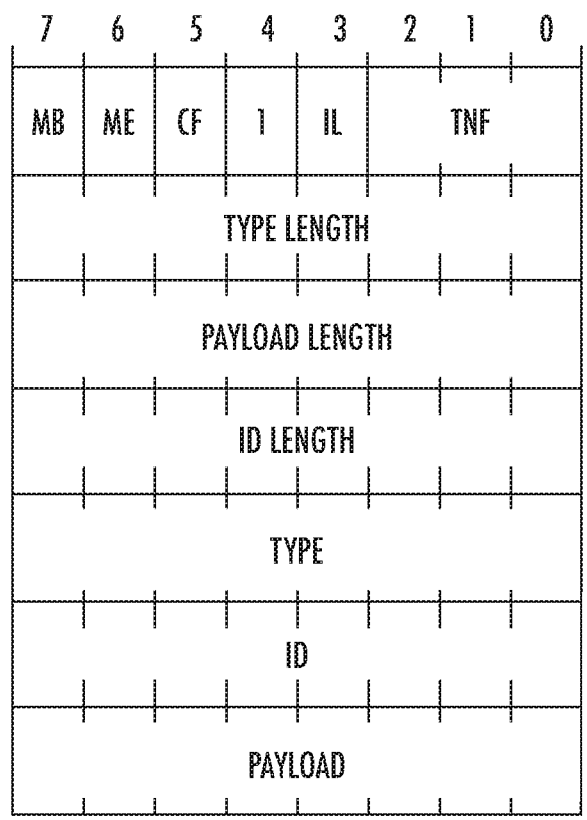
FIG. 5 is an illustration depicting a message used to communicate with a device according to an example embodiment.

FIG. 5 illustrates NDEF short-record layout (SR=1) 500 according to an example embodiment. The emulation program code may be configured to encode the OTP as an NDEF type 4 well known type text tag. In some examples, NDEF messages may comprise one or more records. The emulation program code may be configured to add one or more static tag records in addition to the OTP record. Exemplary tags include, without limitation, Tag type: well-known type, text, encoding English (en); Application ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

FIG. 6 illustrates a message 610 and a message format 620 according to an example embodiment. In one example, if additional tags are to be added, the first byte may change to indicate message begin, but not end, and a subsequent record may be added. Because ID length is zero, ID length field and ID are omitted from the record. An example message may include: UDK AUT key; Derived AUT session key (using 0x00000050); Version 1.0; pATC=0x00000050; RND=4838FB7DC171B89E; MAC=<eight computed bytes>.

In some examples, data may be stored in the mobile device at personalization time by implementing STORE DATA (E2) under secure channel protocol 2. One or more values may be read by the personalization bureau from the EMBOSS files (in a section designated by the Application ID) and one or more store data commands may be transmitted to the mobile device after authentication and secure channel establishment.

In other embodiments, the variables used by the emulation program code of the mobile device for cryptogram authentication may be populated by a service provider that utilizes cryptograms for authentication purposes. In such embodiments, application variables may be populated at an application layer level, wherein a client side application communicates with a server side application to populate the variables for cryptogram authentication prior to first use.

| Item | Length (bytes) | Encrypted? | Notes |
|---|---|---|---|
| pUID | 8 | No | |
| AutKey | 16 | Yes | 3DES Key for Deriving MAC session keys |
| AutKCV | 3 | No | Key Check Value |
| DEKKey | 16 | Yes | 3DES Key for deriving Encryption session key |
| DEKKCV | 3 | No | Key Check Value |
| Card Shared Random | 4 bytes | No | 4 Byte True Random number (pre-generated) |
| NTLV | X Bytes | No | TLV data for NDEF message |

In some examples, the cryptogram provided by the emulation program code may be configured to emulate an RFID tag. The RFID tag may include one or more polymorphic tags. In some examples, each time the tag is read, different cryptographic data is presented that may indicate the authenticity of the mobile device. Based on the one or more applications, an NFC read of the tag may be processed, the token may be transmitted to a server, such as a backend server, and the token may be validated at the server.

In some embodiments, the one or more counters may be configured to prevent a replay attack. For example, if a cryptogram has been obtained and replayed, that cryptogram is immediately rejected if the counter has been read or used or otherwise passed over. If the counter has not been used, it may be replayed. In some examples, the counter that is updated on the card is different from the counter that is updated for transactions.

Figure 7:
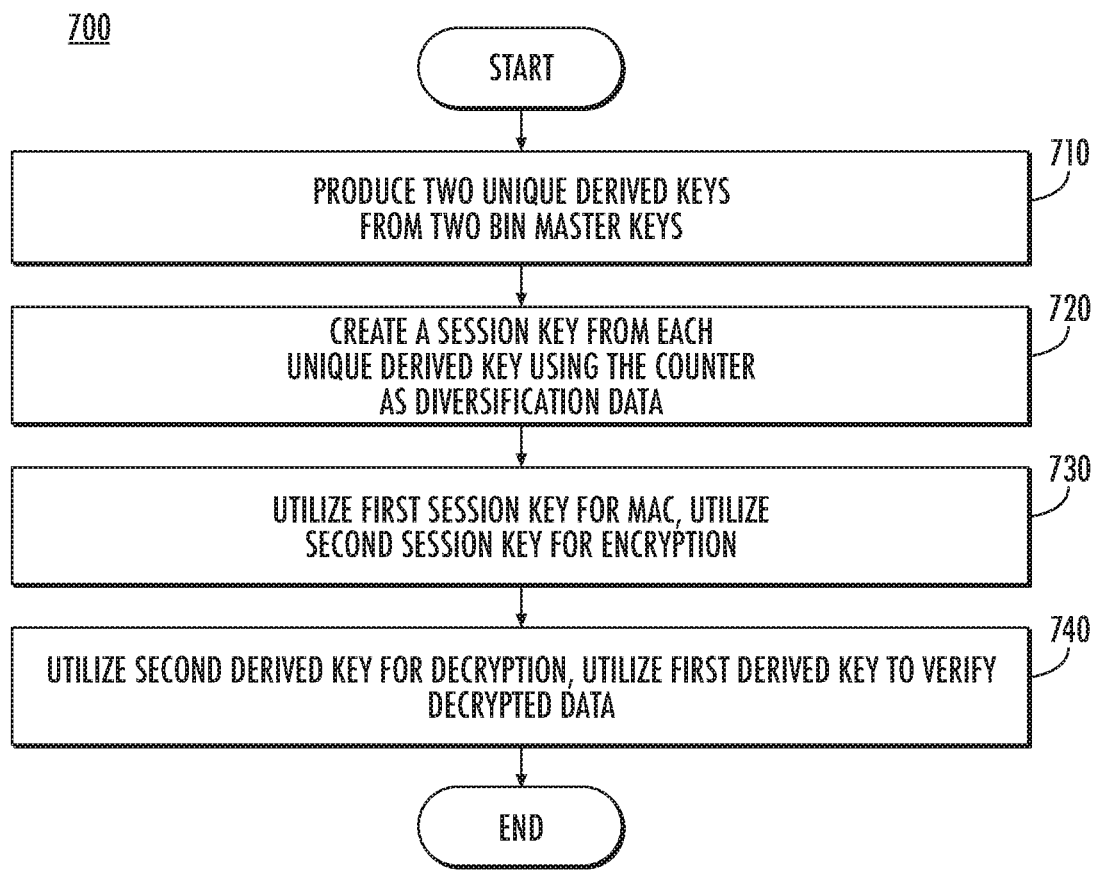
FIG. 7 is a flowchart illustrating key operations according to an example embodiment.

FIG. 7 is a flowchart illustrating exemplary steps of a process 700 that may be performed by the emulation program code to encode cryptograms according to an example embodiment. As illustrated in FIG. 7, at block 710, two bank identifier number (BIN) level master keys may be used in conjunction with the account identifier and customer identifier (pUID) to produce two unique derived keys (UDKs) per mobile device. In some examples, a bank identifier number may comprise one number or a combination of one or more numbers, such as an account number or an unpredictable number provided by one or more servers, may be used for session key generation and/or diversification. The UDKs (AUTKEY and ENCKEY) may be stored in the memory of the mobile device (for example 400, FIG. 4) during the personalization process.

At block 720, the counter may be used as the diversification data, since it changes with each use and provides a different session key each time, as opposed to the master key derivation in which one unique set of keys per card is produced. In some examples, it is preferable to use the 4-byte method for both operations. Accordingly, at block 720, two session keys may be created for each transaction from the UDKs, i.e., one session key from AUTKEY and one session key from ENCKEY. In one embodiment, the session key created from AUTKEY may use the low order of two bytes of the OTP counter for diversification. For the ENC key (i.e., the session key created from ENCKEY), the full length of the OTP counter may be used for the ENC key.

At block 730, the MAC key may be used for preparing the MAC cryptogram, and the ENC key may be used to encrypt the cryptogram. For example, the MAC session key may be used to hash data to produce the cryptogram, and the result may be encrypted with the ENC key before it is transmitted to the one or more servers.

At block 740, verification and processing of the MAC is simplified because 2-byte diversification is directly supported in the MAC authentication functions of payment HSMs. Decryption of the cryptogram is performed prior to verification of the MAC. The session keys are independently derived at the one or more servers, resulting in a first session key (the ENC session key) and a second session key (the MAC session key). The second derived key (i.e., the ENC session key) may be used to decrypt the data, and the first derived key (i.e., the MAC session key) may be used to verify the decrypted data.

For the mobile device, a different unique identifier may be derived which may be related to the application primary account number (PAN) and PAN sequence number, which may be encoded and stored in the memory of the mobile device for an associated contactless card authentication account. The key diversification may be configured to receive the identifier as input with the master key such that one or more keys may be created for each mobile device. In some examples, these diversified keys may comprise a first key and a second key. The first key may include an authentication master key (Card Cryptogram Generation/Authentication Key—Card-Key-Auth) and may be further diversified to create a MAC session key used when generating and verifying a MAC cryptogram. The second key may comprise an encryption master key (Card Data Encryption Key—Card-Key-DEK) and may be further diversified to create an ENC session key used when encrypting and decrypting enciphered data. In some examples, the first and the second keys may be created by diversifying the issuer master keys by combining them with the card's unique ID number (pUID) and the PAN sequence number (PSN) of a payment application. The pUID may comprise a 16-digit numerical value. As explained above, pUID may comprise a 16 digit BCD encoded number. In some examples, pUID may comprise a 14-digit numerical value.

In some examples, since the EMV session key derivation method may wrap at 2^116 uses, the counter such as the full 32-bit counter may be added to the initialization arrays of the diversification method.

In other examples, for example where the mobile device may be used to authenticate transactions in place of, or in conjunction with, credit cards, a number, such as an account number or an unpredictable number provided by one or more servers, may be used for session key generation and/or diversification.

Figure 8:
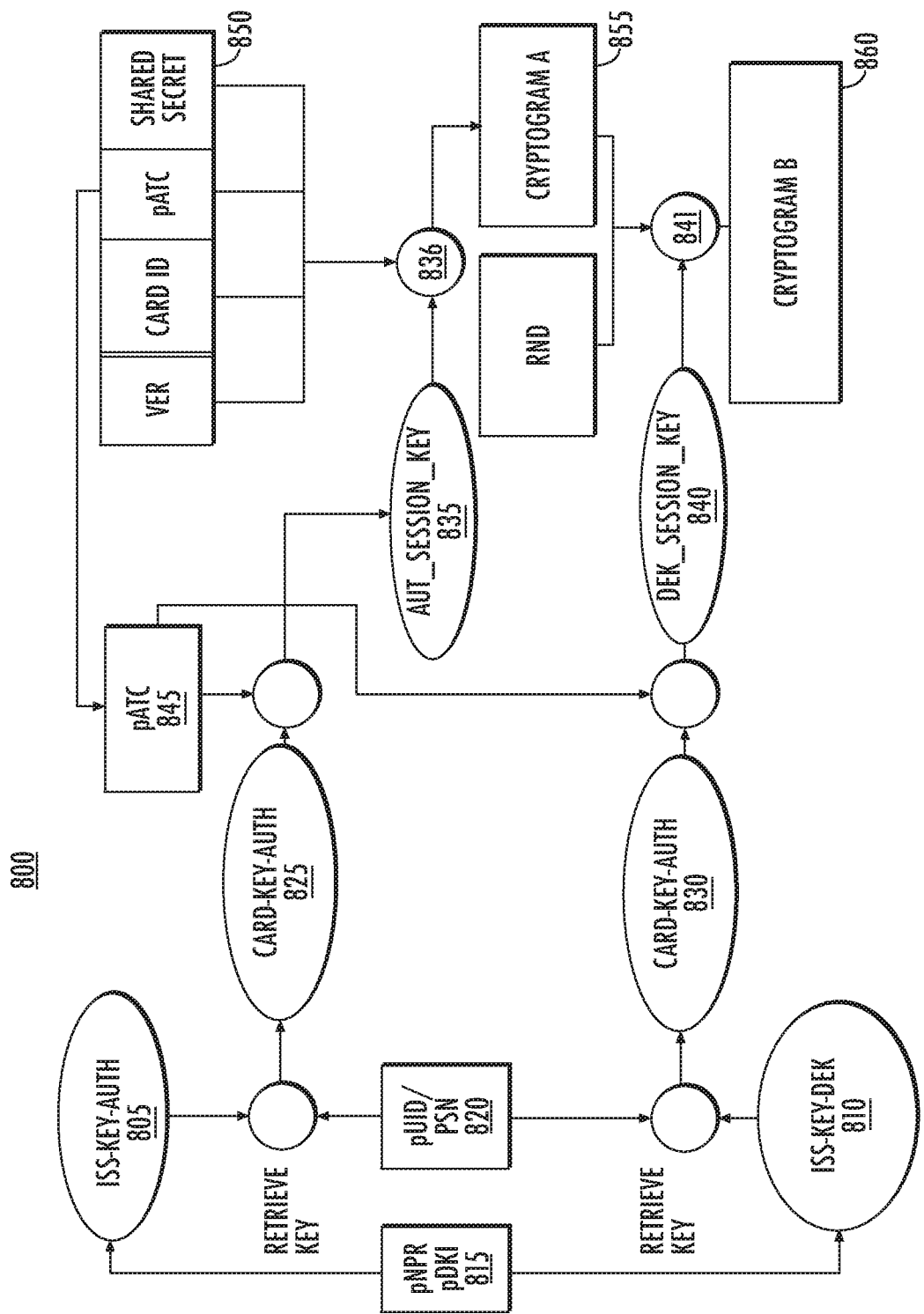
FIG. 8 is a diagram of a key system according to an example embodiment.

FIG. 8 illustrates a diagram of a system 800 configured to implement one or more embodiments of the present disclosure. As explained below, during the mobile device creation process, two cryptographic keys may be assigned uniquely to each mobile device. The cryptographic keys may comprise symmetric keys which may be used in both encryption and decryption of data. Triple DES (3DES) algorithm may be used by EMV and it is implemented by hardware in the mobile device. By using a key diversification process, one or more keys may be derived from a master key based upon uniquely identifiable information for each entity that requires a key.

Regarding master key management, two issuer master keys 805, 810 may be required for each part of the portfolio on which the one or more applications is issued. For example, the first master key 805 may comprise an Issuer Cryptogram Generation/Authentication Key (Iss-Key-Auth) and the second master key 810 may comprise an Issuer Data Encryption Key (Iss-Key-DEK). As further explained herein, two issuer master keys 805, 810 are diversified into card master keys 825, 830, which are unique for each card.

In some examples, a network profile record ID (pNPR) 815 and derivation key index (pDKI) 820, as back office data, may be used to identify which Issuer Master Keys 805, 810 to use in the cryptographic processes for authentication. The system performing the authentication may be configured to retrieve values of pNPR 815 and pDKI 820 for a mobile device at the time of authentication.

In some examples, to increase the security of the solution, a session key may be derived (such as a unique key per session) but rather than using the master key, the unique card-derived keys and the counter may be used as diversification data, as explained above. For example, each time the card may be used in operation, a different key may be used for creating the message authentication code (MAC) and for performing the encryption. Regarding session key generation, the keys used to generate the cryptogram and encipher the data in the one or more applications may comprise session keys based on the card unique keys (Card-Key-Auth 825 and Card-Key-Dek 830). The session keys (Aut-Session-Key 835 and DEK-Session-Key 840) may be generated by the one or more applications and derived by using the application transaction counter (pATC) 845 with one or more algorithms. To fit data into the one or more algorithms, only the 2 low order bytes of the 4-byte pATC 845 may be used. In some examples, the four byte session key derivation method may comprise: F1: =PATC(lower 2 bytes) ∥'F0'∥'00'∥PATC (four bytes) F1: =PATC(lower 2 bytes) ∥'F'∥'00'∥PATC (four bytes) SK:={(ALG (MK) [F1])∥ALG (MK) [F2]}, where ALG may include 3DES ECB and MK may include the card unique derived master key.

As described herein, one or more MAC session keys may be derived using the lower two bytes of pATC 845 counter. At each tap, motion or other engagement with the mobile device, pATC 845 is configured to be updated, and the card master keys Card-Key-AUTH 825 and Card-Key-DEK 830 are further diversified into the session keys Aut-Session-Key 835 and DEK-Session-KEY 840. pATC 845 may be initialized to zero at personalization or application initialization time. In some examples, the pATC counter 845 may be initialized at or before personalization and may be configured to increment by one at each NDEF read.

Further, the mechanism for counter update for each contactless card emulated by the mobile device may be unique, and assigned either by personalization, or algorithmically assigned by pUID or other identifying information, such as phone numbers, EMEI numbers or the like. For example, mobile devices having odd EMEI or phone numbers may increment or decrement by 2 and mobile devices having even EMEI or phone numbers may increment or decrement by 5.

In some examples, the update may also vary in sequential reads, such that a contactless card associated counter may increment in sequence by 1, 3, 5, 2, 2, . . . repeating. The specific sequence or algorithmic sequence may be defined at personalization time, or from one or more processes derived from unique identifiers. This may make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 835. The data specified in cryptogram may be processed with javacard.signature method: ALG_DES_MAC8_ISO9797_1_M2_ALG3 to correlate to EMV ARQC verification methods. The key used for this computation may comprise a session key AUT-Session-Key 835, as explained above. As explained above, the low order two bytes of the counter may be used to diversify for the one or more MAC session keys. As explained below, AUT-Session-Key 835 may be used to MAC data 850, and the resulting data or cryptogram A 855 and random number RND may be encrypted using DEK-Session-Key 840 to create cryptogram B or output 860 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 840 derived from the Card-Key-DEK 830. In this case, the ATC value for the session key derivation is the least significant byte of the counter pATC 845.

The format below represents a binary version example embodiment. Further, in some examples, the first byte may be set to ASCII 'A'.

| Message Format | | | | | |
|---|---|---|---|---|---|
| 1 0x43 (Message Type 'A') | 2 Version | 4 pATC | 8 RND | 8 Cryptogram A (MAC) | |
| Cryptogram A (MAC) | 8 bytes | | | | |
| MAC of 2 Version | 8 pUID | 4 pATC | 4 Shared Secret | | 18 bytes input data |

| Message Format | | | | |
|---|---|---|---|---|
| 1 0x43 (Message Type 'A') | 2 Version | 4 pATC | 16 Cryptogram B | |
| Cryptogram A (MAC) | 8 bytes | | | |
| MAC of 2 Version | 8 pUID | 4 pATC | 4 Shared Secret | 18 bytes input data |
| Cryptogram B | 16 bytes | | | |
| Symmetric Encryption of 8 RND | 8 Cryptogram A | | | |

Another exemplary format is shown below. In this example, the tag may be encoded in hexadecimal format.

| Message Format | | | | |
|---|---|---|---|---|
| 2 Version | 8 pUID | 4 pATC | 8 RND | 8 Cryptogram A (MAC) |
| 8 bytes | | | | |
| 8 pUID | 8 pUID | 4 pATC | 4 Shared Secret | 18 bytes input data |

| Message Format | | | |
|---|---|---|---|
| 2 Version | 8 pUID | 4 pATC | 16 Cryptogram B |
| 8 bytes | | | |
| 8 pUID | 8 pUID | 4 pATC | 4 Shared Secret | 18 bytes input data |
| Cryptogram B | 16 | | |
| Symmetric Encryption of 8 RND | 8 Cryptogram A | | |

The UID field of the received message may be extracted to derive, from master keys Iss-Key-AUTH 805 and Iss-Key-DEK 810, the card master keys (Card-Key-Auth 825 and Card-Key-DEK 830) for that particular card. Using the card master keys (Card-Key-Auth 825 and Card-Key-DEK 830), the counter (pATC) field of the received message may be used to derive the session keys (Aut-Session-Key 835 and DEK-Session-Key 840) for that particular card. Cryptogram B 860 may be decrypted using the DEK-Session-KEY, which yields cryptogram A 855 and RND, and RND may be discarded. The UID field may be used to look up the shared secret of the contactless card emulated by the mobile device which, along with the Ver, UID, and pATC fields of the message, may be processed through the cryptographic MAC using the re-created Aut-Session-Key to create a MAC output, such as MAC'. If MAC' is the same as cryptogram A 855, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 835. The input data 850 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applications to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 836, data 850 is processed through the MAC using Aut-Session-Key 835 to produce MAC output (cryptogram A) 855, which is encrypted.

In order to provide additional protection against brute force attacks exposing the keys on the mobile device, it is desirable that the MAC cryptogram 855 be enciphered. In some examples, data or cryptogram A 855 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 840. In the encryption operation 841, data or cryptogram A 855 and RND are processed using DEK-Session-Key 840 to produce encrypted data, cryptogram B 860. The data 855 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data may be unable to determine when the correct key has been used, as correctly decrypted data may be indistinguishable from incorrectly decrypted data due to its random appearance.

Figure 9:
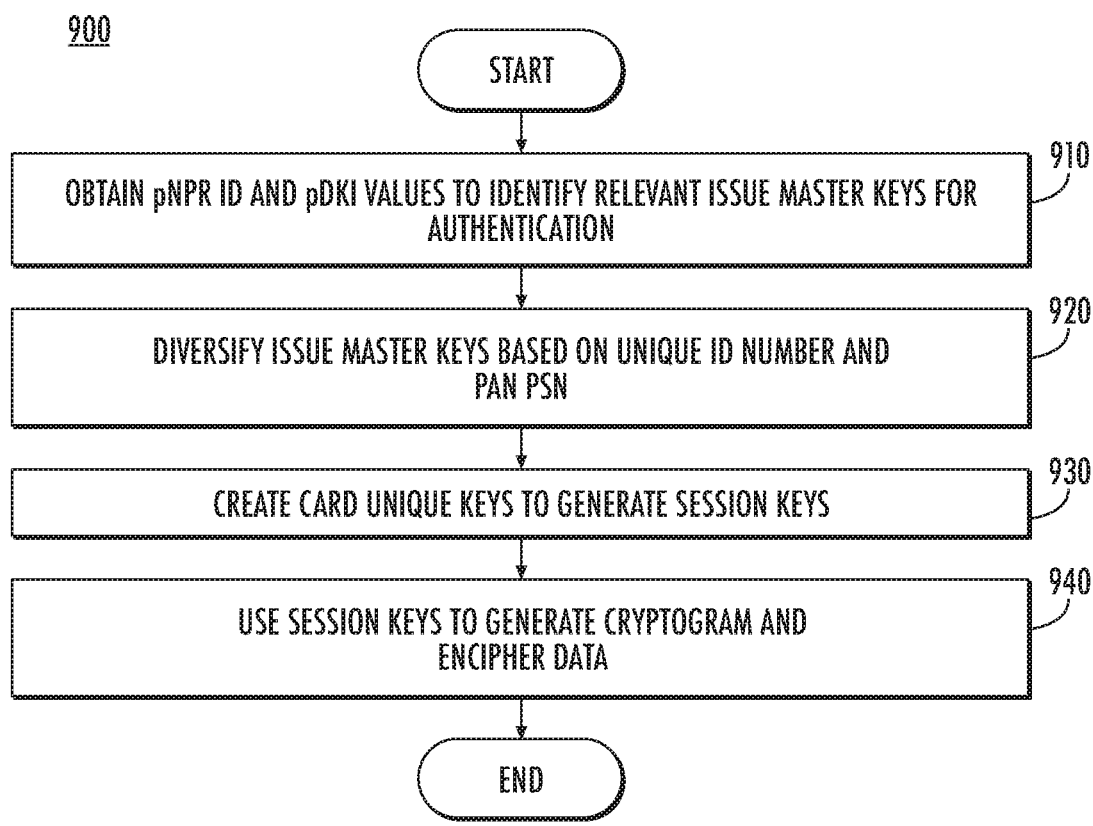
FIG. 9 is a flowchart of a method of generating a cryptogram according to an example embodiment.

FIG. 9 illustrates a method 900 which may be implemented by the emulation program coded for generating a cryptogram. For example, at block 910, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card emulated by the mobile device at the time of authentication.

At block 920, Issuer Master Keys may be diversified by combining them with the emulated contactless card unique ID number (pUID) and the PAN sequence number (PSN) of one or more applications, for example, a payment application.

At block 930, Card-Key-Auth and Card-Key-DEK (unique card keys) may be created by diversifying the Issuer Master Keys to generate session keys which may be used to generate a MAC cryptogram.

At block 940, the keys used to generate the cryptogram and encipher the data in the one or more applications may comprise the session keys of block 930 based on the emulated card unique keys (Card-Key-Auth and Card-Key-DEK). In some examples, these session keys may be generated by the one or more applications and derived by using pATC, resulting in session keys Aut-Session-Key and DEK-Session-Key.

Figure 10:
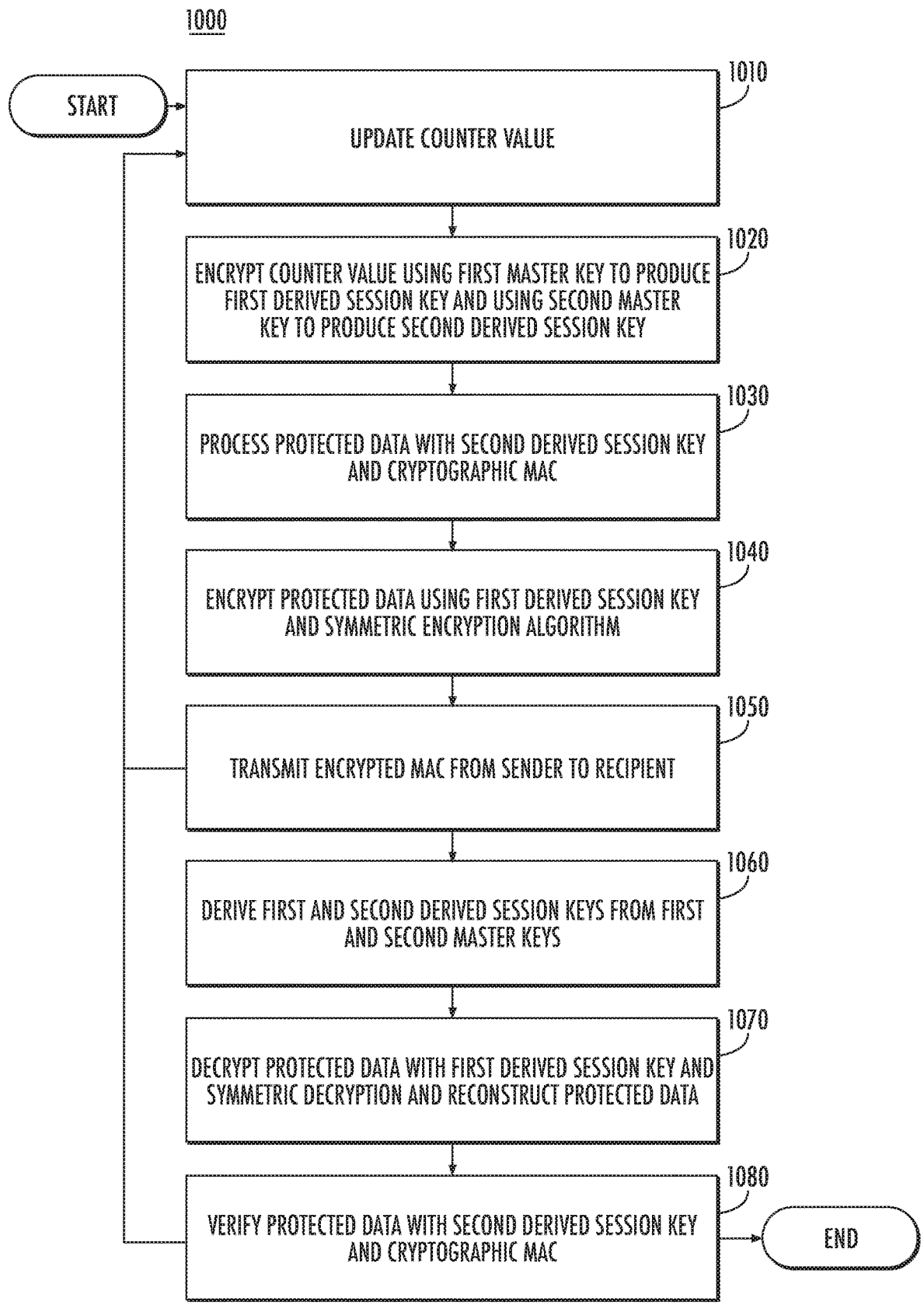
FIG. 10 is a flowchart illustrating a process of key diversification according to an example embodiment.

FIG. 10 depicts an exemplary process 1000 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at block 1010, and other data, such as data to be protected, which it may secure share with the recipient.

At block 1020, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

At block 1030, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 1040, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 1050, the encrypted MAC is transmitted, from the sender to the recipient, with sufficient information to identify additional secret information (such as shared secret, master keys, etc.), for verification of the cryptogram.

At block 1060, the recipient may use the received counter value to independently derive the two derived session keys from the two master keys as explained above.

At block 1070, the data encryption derived session key may be used in conjunction with the symmetric decryption operation to decrypt the protected data. Additional processing on the exchanged data may then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 1080, the data integrity derived session key may be used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the mobile device which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange may update the counter value (returning to block 1010) and a new set of session keys may be created (at block 1020). In some examples, the combined random data may be discarded.

Figure 11:
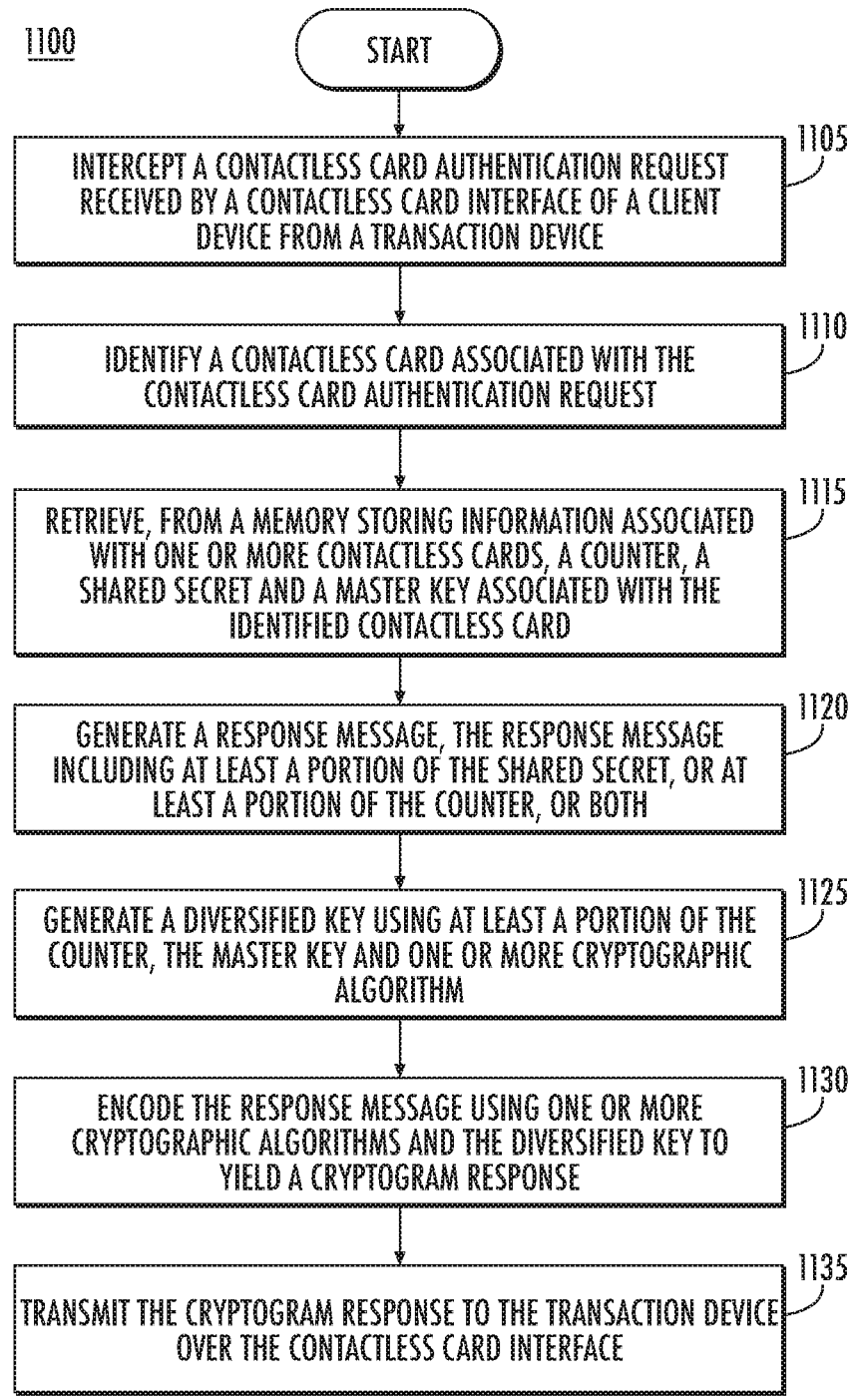
FIG. 11 is a flowchart illustrating exemplary steps that may be performed by a contactless card emulation process as disclosed herein.

FIG. 11 is a flow diagram provided to illustrate an exemplary process 1100 of using emulation program code by a mobile device to provide contactless card authentication cryptograms as described above. At step 1105, the emulation program code intercepts a contactless card authentication request received by a contactless card interface of a client device from a transaction device. At step 1110, the emulation program code identifies a contactless card associated with the contactless card authentication request, (by decoding the NFC communication, or in response to user interface of the mobile device, or other method). At step 1115, the emulation program code retrieves, from a memory of the mobile device that stores information associated with one or more contactless cards, a counter, a shared secret and a master key associated with the identified contactless card. At step 1120, the emulation program code generates a response message, the response message including at least a portion of the shared secret, or at least a portion of the counter, or both. At step 1125, the emulation program code may generating a diversified key using at least a portion of the counter, the master key and one or more cryptographic algorithm, for example as described with regard to FIGS. 7-9. At step 1130, the emulation program code encodes the response message using one or more cryptographic algorithms and the diversified key to yield a cryptogram response. At step 1135, the emulation program code forwards the cryptogram response to the NFC interface, which transmits the cryptogram response to the transaction device over the contactless card interface.

Figure 12:
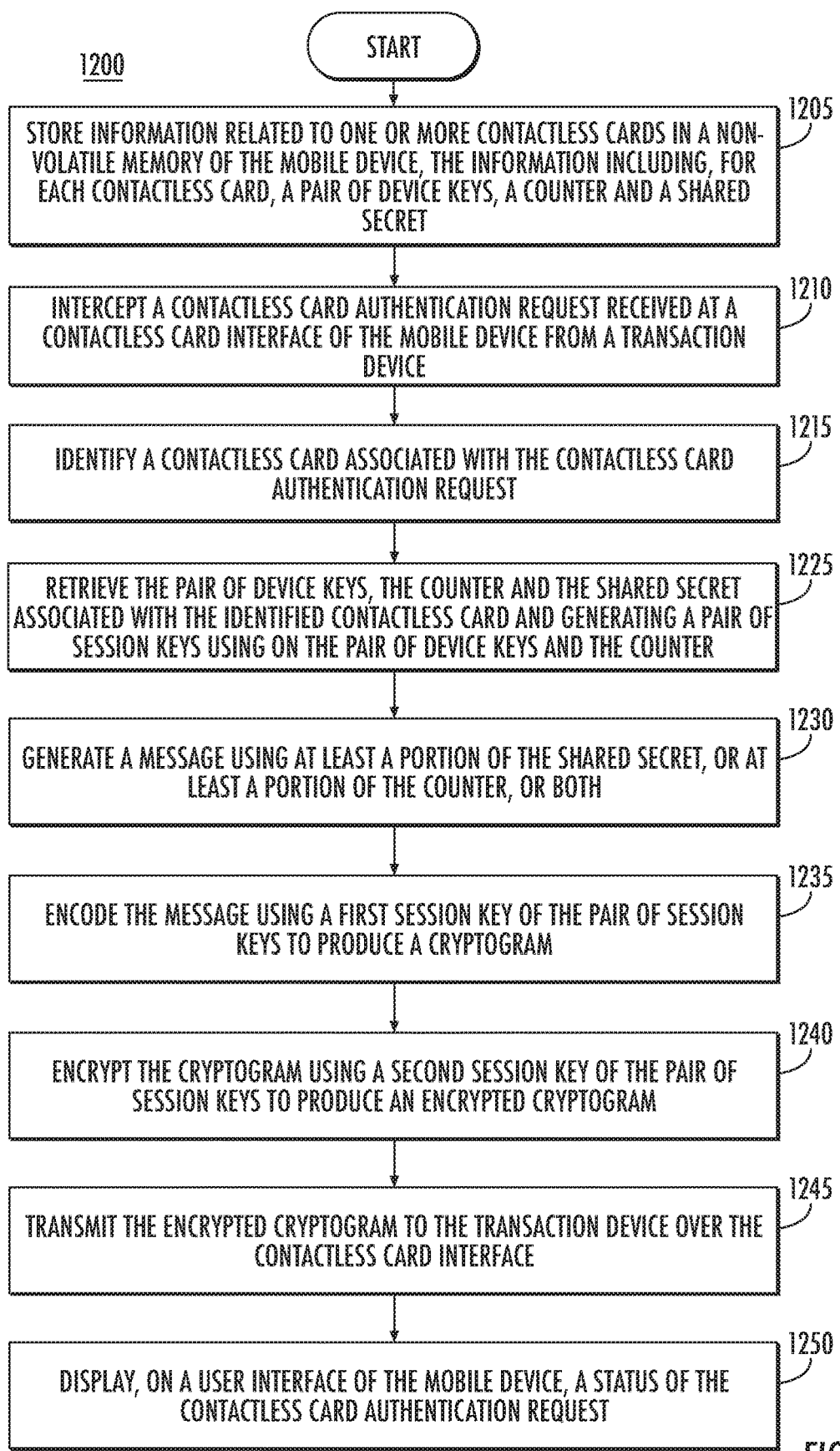
FIG. 12 is a flowchart illustrating exemplary steps that may be performed by of a contactless card emulation process as disclosed herein.

FIG. 12 illustrates an alternate embodiment of a process 1200 that may be performed by a contactless card emulation program code of a mobile device. At step 1205, the program code stores information related to one or more contactless cards in a non-volatile memory of the mobile device, the information including, for each contactless card, a pair of device keys, a counter and a shared secret. At step 1210, the program code monitors an NFC interface and intercepts a contactless card authentication request received at a contactless card interface of the mobile device from a transaction device. At step 1215, the emulation program code generates an encrypted cryptogram by first identifying a contactless card associated with the contactless card authentication request. The method next retrieves the pair of device keys, the counter and the shared secret associated with the identified contactless card at step 1225 and generates a pair of session keys using on the pair of device keys and the counter, for example using techniques described above. At step 1230, the program code generates a message using at least a portion of the shared secret, or at least a portion of the counter, or both. At step 1235, the program code encodes the message using a first session key of the pair of session keys to produce a cryptogram and at step 1240 encrypts the cryptogram using a second session key of the pair of session keys to produce an encrypted cryptogram. At step 1245, the emulation program code forwards the encrypted cryptogram to the contactless card interface for transmission to the transaction device. In one embodiment, at step 1250 the emulation program code of the mobile device displays, on a user interface of the mobile device, a status of the contactless card authentication request.

In some embodiments, the emulation program code may be used in conjunction with other authentication functions provided by the mobile device to provide dual factor authentication for transactions. For example, mobile devices generally include one or more sensors, for example a touch screen, camera, retinal scanner, thumbprint scanner, etc. that may be used to verify identify via validation of biometric information related to a user of the mobile device. In addition, mobile devices may include a keyboard, implemented as keys or a touchscreen, enabling a user to input a passcode, query response, or other factor establishing identity through knowledge. Mobile devices may also include microphones capable of recording vocal input, enabling voice recognition of pass phrase retrieval to validate user identity. In one embodiment, the mobile device may utilize one or more of such authentication methods to validate a user's identity. In one embodiment, the emulation program code may, in response to interception of a contactless card authentication request, initiate a first factor authentication request to the user, requesting that the user of the mobile device capture authentication information, such as an image capture, thumbprint, password, query response, etc. In one embodiment, the captured information may be compared by the mobile device against an expected response to authenticate the user prior to allowing the emulation program code to generate a cryptogram response. In other embodiments, the authentication response may be incorporated into the cryptogram, e.g., as part of the message prior to hashing, or to the tail of the cryptogram prior to encryption, for validation with the cryptogram by an authenticating party.

The contactless card emulation program code may be used (either alone or with second factor authentication as described above) to provide security factor authentication for a variety of purposes, including but not limited to support application or data access, to verify identity for purchases, such as at a POS device, including without limitation a kiosk, a checkout register, a payment station, or other terminal, etc.

Accordingly, a system and method that enables mobile devices (e.g. including but not limited to a mobile phone or the like), to intercept and responds to contactless card authentication requests has been described. Enabling mobile phone devices to emulate contactless cards provides numerous advantages, including but not limited to reducing issues associated with lost or damaged cards, providing the ability to use a common device to emulate multiple contactless cards and leveraging features of the device to enable dual-factor authentication.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device comprising:
   a processor;
   a plurality of network interfaces including a contactless card interface;
   a non-volatile memory having contactless card emulation program code stored thereon, the contactless card emulation program code operable when executed upon by the processor to:
   detect receipt of a contactless card authentication request received at the contactless card interface from a transaction device;
   identify an emulated contactless card associated with the contactless card authentication request;
   determine information in memory relating to the emulated contactless card including a counter, a first master key, a second master key, and a shared secret;
   retrieve, from the memory, the information identified relating to the emulated contactless card;
   generate a first diversified key using at least the counter, the first master key, and one or more cryptographic algorithms;
   generate a second diversified key using at least the counter, the second master key, and the one or more cryptographic algorithms;
   encrypt, using the first diversified key and the one or more cryptographic algorithms, the shared secret and the counter to generate a cryptogram;
   encrypt the cryptogram using the second diversified key and the one or more cryptographic algorithms to generate an encrypted cryptogram;
   transmit the encrypted cryptogram to the transaction device over the contactless card interface; and
   increment the counter associated with the identified contactless card responsive to transmission of the encrypted cryptogram to the transaction device over the contactless card interface.

2. The device of claim 1, wherein the one or more cryptographic algorithms comprises at least one of a symmetric encryption algorithm, a hash-based message authentication code (HMAC) algorithm, and a cipher-based message authentication code (CMAC) algorithm.

3. The device of claim 1, wherein the contactless card interface comprises a near field communications (NFC) interface, wireless interface, or an RF interface.

4. The device of claim 1, wherein the contactless card emulation program code updates the first and second diversified keys for each cryptogram response transmission.

5. The device of claim 4, wherein the contactless card emulation program code updates the counter associated with the identified contactless card according to a predetermined update protocol of the identified contactless card to update the first and second diversified keys.

6. The device of claim 1, wherein the contactless card emulation program periodically modifies the first and second master keys.

7. The device of claim 1 wherein the contactless card emulation program code further includes first factor authentication program code configured to cause the device to:
   display an authentication prompt on a user interface of the device;
   capture an authentication response in response to the authentication prompt;
   validate the authentication response by comparing the authentication response to stored authentication data associated with an owner of the identified contactless card; and
   wherein the first factor authentication program code precludes production of the encrypted cryptogram in response to a mismatch between the stored authentication data and the authentication response.

8. The device of claim 7 wherein the authentication response includes a biometric input, an image input, a passcode, a query response, or a combination thereof.

9. The device of claim 1, wherein the first diversified key is generated using a low order of two bytes of the counter.

10. The device of claim 1, wherein the second diversified key is generated using all bytes of the counter.

11. A computer-implemented method, comprising:
- detecting receipt of a contactless card authentication request received at a contactless card interface from a transaction device;
- identifying an emulated contactless card associated with the contactless card authentication request;
- determining information relating to the emulated contactless card including a first master key, a second master key, and message authentication data comprising, a counter and a shared secret;
- generating a first diversified key using at least the counter, the first master key, and one or more cryptographic algorithms;
- generating a second diversified key using at least the counter, the second master key, and the one or more cryptographic algorithms;
- encrypting, using the first diversified key and the one or more cryptographic algorithms, the shared secret and the counter to generate a cryptogram;
- encrypting the cryptogram using the second diversified key and the one or more cryptographic algorithms to generate an encrypted cryptogram;
- transmitting the encrypted cryptogram to the transaction device over the contactless card interface; and
- incrementing the counter associated with the identified contactless card responsive to transmission of the encrypted cryptogram to the transaction device over the contactless card interface.

12. The computer-implemented method of claim 11, wherein the one or more cryptographic algorithms comprises at least one of a symmetric encryption algorithm, a hash-based message authentication code (HMAC) algorithm, and a cipher-based message authentication code (CMAC) algorithm.

13. The computer-implemented method of claim 11, wherein the contactless card interface comprises a near field communications (NFC) interface, wireless interface, or an RF interface.

14. The computer-implemented method of claim 11, wherein the contactless card emulation program code updates the first and second diversified keys for each cryptogram response transmission.

15. The computer-implemented method of claim 14, wherein the contactless card emulation program code updates the counter associated with the identified contactless card according to a predetermined update protocol of the identified contactless card.

16. The computer-implemented method of claim 11, wherein the contactless card emulation program periodically modifies the first and second master keys.

17. The computer-implemented method of claim 11, wherein the contactless card emulation program code further includes first factor authentication program code configured to cause a device to:
- display an authentication prompt on a user interface of the device;
- capture an authentication response in response to the authentication prompt;
- validate the authentication response by comparing the authentication response to stored authentication data associated with the contactless card; and
- wherein the first factor authentication program code precludes generating of the encrypted cryptogram in response to a mismatch between the stored authentication data and the authentication response.

18. The computer-implemented method of claim 17, wherein the authentication response includes a biometric input, an image input, a passcode, a query response, or a combination thereof.

19. The computer-implemented method of claim 11, wherein the first diversified key is generated using a low order of two bytes of the counter.

20. The computer-implemented method of claim 11, wherein the second diversified key is generated using all bytes of the counter.

* * * * *